(12) United States Patent
Yeh

(10) Patent No.: US 10,824,340 B2
(45) Date of Patent: Nov. 3, 2020

(54) METHOD FOR MANAGING ASSOCIATION RELATIONSHIP OF PHYSICAL UNITS BETWEEN STORAGE AREA AND TEMPORARY AREA, MEMORY CONTROL CIRCUIT UNIT, AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 478 days.

(21) Appl. No.: 14/811,844

(22) Filed: Jul. 29, 2015

(65) Prior Publication Data

US 2016/0364141 A1 Dec. 15, 2016

(30) Foreign Application Priority Data

Jun. 12, 2015 (TW) .............................. 104119110 A

(51) Int. Cl.
*G06F 3/06* (2006.01)
*G06F 12/02* (2006.01)

(52) U.S. Cl.
CPC .............. *G06F 3/061* (2013.01); *G06F 3/064* (2013.01); *G06F 3/0679* (2013.01); *G06F 12/0246* (2013.01); *G06F 2212/1016* (2013.01); *G06F 2212/7201* (2013.01)

(58) Field of Classification Search
CPC ........ G06F 3/061; G06F 3/064; G06F 3/0679; G06F 12/0246; G06F 2212/7201
See application file for complete search history.

(56) References Cited

U.S. PATENT DOCUMENTS 7,869,219 B2 * 1/2011 Ma ...................... G11C 11/5621
361/737
7,944,702 B2 * 5/2011 Ni ..................... G06K 19/07732
361/737

(Continued)

FOREIGN PATENT DOCUMENTS

CN 103514096 1/2014
TW 201351140 12/2013

OTHER PUBLICATIONS

Phil Storr, "Phil Storrs PC Hardware Book", Dec. 26, 1998, pp. 1-8, http://philipstorr.id.au/pcbook/book2/memory.htm.*

(Continued)

*Primary Examiner* — Christopher D Birkhimer
(74) *Attorney, Agent, or Firm* — JCIPRNET

(57) ABSTRACT

A memory management method is provided according to an exemplary embodiment. The method includes: receiving a write command and determining whether a usage status of physical units associated to a storage area conforms to a first predetermined status; storing write data corresponding to the write command to at least one of physical units associated to a temporary area if the usage status of the physical units associated to the storage area conforms to the first predetermined status; associating the at least one physical unit storing the write data to the storage area; and allocating at least one logical unit to map the at least one physical unit associated to the storage area.

12 Claims, 13 Drawing Sheets

(56) References Cited

U.S. PATENT DOCUMENTS

| | | | | | |
|---|---|---|---|---|---|
| 8,046,533 | B2* | 10/2011 | Kompella | G06F 3/0608 | 711/112 |
| 8,074,113 | B2* | 12/2011 | Kompella | G06F 11/1441 | 714/15 |
| 8,078,794 | B2* | 12/2011 | Lee | G06F 3/0613 | 711/103 |
| 8,241,047 | B2* | 8/2012 | Ni | G06K 19/07732 | 439/131 |
| 8,266,367 | B2* | 9/2012 | Yu | G06F 3/0608 | 711/103 |
| 8,321,597 | B2* | 11/2012 | Yu | G06F 11/108 | 710/22 |
| 8,452,912 | B2* | 5/2013 | Lee | G06F 12/0246 | 710/54 |
| 8,473,675 | B2* | 6/2013 | Miyazaki | G06F 12/0804 | 711/113 |
| 8,543,742 | B2* | 9/2013 | Yu | G06F 3/0604 | 710/22 |
| 8,806,165 | B2* | 8/2014 | Selfin | G06F 3/061 | 711/103 |
| 8,819,338 | B2* | 8/2014 | Uehara | G06F 3/0688 | 711/114 |
| 8,868,869 | B2* | 10/2014 | Jones | G06F 3/065 | 707/639 |
| 8,874,835 | B1* | 10/2014 | Davis | G06F 3/0679 | 711/103 |
| 8,891,298 | B2* | 11/2014 | Rao | G11C 16/3495 | 365/185.03 |
| 8,892,814 | B2* | 11/2014 | Yeh | G06F 12/0246 | 711/100 |
| 8,898,370 | B2* | 11/2014 | Yeh | G06F 12/0246 | 711/103 |
| 8,909,846 | B2* | 12/2014 | Chang | G06F 12/0246 | 711/103 |
| 8,924,638 | B2* | 12/2014 | Carannante | G06F 12/0246 | 711/103 |
| 8,954,654 | B2* | 2/2015 | Yu | G06F 12/0246 | 711/103 |
| 8,959,280 | B2* | 2/2015 | Yu | G06F 3/0608 | 711/103 |
| 8,972,681 | B2* | 3/2015 | Jones | G06F 3/065 | 707/639 |
| 9,003,159 | B2* | 4/2015 | Deshkar | G06F 12/0246 | 707/813 |
| 9,037,780 | B2* | 5/2015 | Jang | G06F 13/38 | 711/103 |
| 2008/0209114 | A1* | 8/2008 | Chow | G06F 12/0804 | 711/103 |
| 2008/0215800 | A1* | 9/2008 | Lee | G06F 3/0613 | 711/103 |
| 2009/0177835 | A1* | 7/2009 | Ma | G11C 11/5621 | 711/103 |
| 2009/0193184 | A1* | 7/2009 | Yu | G06F 12/0246 | 711/103 |
| 2009/0240873 | A1* | 9/2009 | Yu | G06F 3/0608 | 711/103 |
| 2010/0023682 | A1* | 1/2010 | Lee | G06F 12/0246 | 711/103 |
| 2010/0075517 | A1* | 3/2010 | Ni | G06K 19/07732 | 439/131 |
| 2010/0088463 | A1* | 4/2010 | Im | G06F 12/0246 | 711/103 |
| 2010/0232049 | A1* | 9/2010 | Kompella | G06F 3/0608 | 360/55 |
| 2010/0235678 | A1* | 9/2010 | Kompella | G06F 11/1441 | 714/5.1 |
| 2010/0281209 | A1* | 11/2010 | Ni | G06K 19/07732 | 711/103 |
| 2011/0125954 | A1* | 5/2011 | Yeh | G06F 12/0246 | 711/103 |
| 2011/0138110 | A1* | 6/2011 | Liu | G06F 12/0246 | 711/103 |
| 2011/0302358 | A1* | 12/2011 | Yu | G06F 11/108 | 711/103 |
| 2012/0030415 | A1* | 2/2012 | Selfin | G06F 3/061 | 711/103 |
| 2012/0278543 | A1* | 11/2012 | Yu | G06F 3/0604 | 711/103 |
| 2012/0317346 | A1* | 12/2012 | Yeh | G06F 12/0246 | 711/103 |
| 2013/0124787 | A1* | 5/2013 | Schuette | G06F 12/0246 | 711/103 |
| 2013/0290613 | A1* | 10/2013 | Uehara | G06F 3/0688 | 711/103 |
| 2014/0006688 | A1* | 1/2014 | Yu | G11C 16/10 | 711/103 |
| 2014/0143476 | A1* | 5/2014 | Sela | G06F 3/0619 | 711/103 |
| 2014/0189211 | A1* | 7/2014 | George | G06F 3/0613 | 711/103 |
| 2014/0189276 | A1* | 7/2014 | Chang | G06F 16/13 | 711/165 |
| 2014/0189286 | A1* | 7/2014 | Chang | G06F 12/109 | 711/208 |
| 2014/0281151 | A1* | 9/2014 | Yu | G06F 1/30 | 711/103 |
| 2014/0310574 | A1* | 10/2014 | Yu | G06F 11/1072 | 714/773 |
| 2014/0325115 | A1* | 10/2014 | Ramsundar | G06F 12/0238 | 711/102 |
| 2014/0331024 | A1* | 11/2014 | Wu | G06F 12/06 | 711/209 |
| 2014/0372679 | A1* | 12/2014 | Flynn | G06F 3/0652 | 711/103 |
| 2015/0012687 | A1* | 1/2015 | Huang | G06F 3/0659 | 711/103 |
| 2015/0074371 | A1* | 3/2015 | Hashimoto | G06F 3/06 | 711/202 |
| 2015/0161039 | A1* | 6/2015 | Yeh | G06F 12/0246 | 711/103 |
| 2015/0161060 | A1* | 6/2015 | Suzuki | G06F 12/1408 | 713/193 |
| 2015/0186270 | A1* | 7/2015 | Peng | G11C 16/16 | 711/3 |

OTHER PUBLICATIONS

Webopedia, "Virtual Memory", Apr. 11, 2001, pp. 1-2, https://web.archive.org/web/20010411032249/https://www.webopedia.com/TERM/V/virtual_memory.html.*

Nelson Duann, "SLC & MLC Hybrid", FlashMemory Summit, Aug. 2008, pp. 10-18, https://www.flashmemorysummit.com/English/Collaterals/Proceedings/2008/20080812_F2A_Duann.pdf (Year: 2008).*

Murugan et al., "Hybot: Towards Improved Performance in Hybrid SLC-MLC Devices", IEEE 20th International Symposium on Modeling, Analysis and Simulation of Computer and Telecommunication Systems, 2012, pp. 1-4, https://ieeexplore.ieee.org/stamp/stamp.jsp?tp=&arnumber=6298208 (Year: 2012).*

Park et al., "A Hybrid Flash Translation Layer Design for SLC-MLC Flash Memory Based Multibank Solid State Disk", Aug. 11, 2010, pp. 1-12, https://www.sciencedirect.com/science/article/pii/S0141933110000475 (Year: 2010).*

Microsoft, "Computer Dictionary", Fifth Edition, 2002, pp. 130 and 349 (Year: 2002).*

Merriam-Webster, "Associate", Mar. 26, 2014, 1-4, https://web.archive.org/web/20140326035351/https://www.merriam-webster.com/dictionary/associated (Year: 2014).*

"Office Action of Taiwan Counterpart Application", dated Mar. 21, 2016, p. 1-p. 13, in which the listed reference was cited.

"Office Action of China Counterpart Application," dated Sep. 30, 2018, pp. 1-14.

* cited by examiner

| Lower physical programming unit | Middle physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

METHOD FOR MANAGING ASSOCIATION RELATIONSHIP OF PHYSICAL UNITS BETWEEN STORAGE AREA AND TEMPORARY AREA, MEMORY CONTROL CIRCUIT UNIT, AND MEMORY STORAGE APPARATUS

CROSS-REFERENCE TO RELATED APPLICATION

This application claims the priority benefit of Taiwan application serial no. 104119110, filed on Jun. 12, 2015. The entirety of the above-mentioned patent application is hereby incorporated by reference herein and made a part of this specification.

BACKGROUND

Technology Field

The disclosure relates to a memory management mechanism, and more particularly, to a memory management method, a memory control circuit unit, and a memory storage apparatus.

Description of Related Art

Digital cameras, mobile phones, and MP3 players have seen rapid growth in recent years. Consequently, the consumers' demand for storage media has increased tremendously. Since a rewritable non-volatile memory has characteristics such as data non-volatility, power-saving, small size, lack of mechanical structure, and fast reading speed, the rewritable non-volatile memory is most suitable for electronic products such as notebook computers. A solid state disc is a memory storage apparatus adopting flash memory as storage medium. Therefore, the flash memory industry has become a relatively important part in the electronic industry in recent years.

In certain memory storage apparatuses, the rewritable non-volatile memory is divided into a temporary area and a storage area. The storage area is the final location of user data, and the temporary area is configured to temporarily store data to be stored in the storage area. In general, the size of the temporary area and the size of the storage area are previously configured and fixed; as the configured size of the temporary area is increased, the data access speed for the rewritable non-volatile memory may be greater, but the overall storage capacity thereof configured to store user data is relatively reduced; as the configured size of the temporary area is reduced, the storage capacity in the rewritable non-volatile memory configured to store user data is increased, but the data access speed thereof may be reduced.

Therefore, how to improve data access speed of the memory module in the case of limited overall storage capacity of the rewritable non-volatile memory is one of the important objects of those skilled in the art.

Nothing herein should be construed as an admission of knowledge in the prior art of any portion of the disclosure. Furthermore, citation or identification of any document in this application is not an admission that such document is available as prior art to the disclosure, or that any reference forms a part of the common general knowledge in the art.

SUMMARY

The disclosure provides a memory management method, a memory control circuit unit, and a memory storage apparatus capable of improving data access speed of a rewritable non-volatile memory module in the case of limited overall storage capacity of the rewritable non-volatile memory module.

An exemplary embodiment of the disclosure provides a memory management method configured for a rewritable non-volatile memory module, wherein the rewritable non-volatile memory module includes a plurality of physical units, and the memory management method includes: receiving a write command and determining whether a usage status of a plurality of physical units associated to a storage area among the physical units conforms to a first predetermined status; storing write data corresponding to the write command to at least one physical unit associated to a temporary area among the physical units if the usage status of the physical units associated to the storage area conforms to the first predetermined status; associating the at least one physical unit storing the write data to the storage area; and allocating at least one logical unit to map the at least one physical unit associated to the storage area.

Another exemplary embodiment of the disclosure provides a memory control circuit unit configured to control the rewritable non-volatile memory module, wherein the rewritable non-volatile memory module includes a plurality of physical units, and the memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface, wherein the memory management circuit is configured to receive a write command and determine whether the usage status of a plurality of physical units associated to a storage area among the physical units conforms to a first predetermined status, wherein the memory management circuit is further configured to send a write command sequence instructing to store write data corresponding to the write command to at least one physical unit associated to a temporary area among the physical units if the usage status of the physical units associated to the storage area conforms to the first predetermined status, wherein the memory management circuit is further configured to associate the at least one physical unit storing the write data to the storage area, wherein the memory management circuit is further configured to allocate at least one logical unit to map the at least one physical unit associated to the storage area.

Another exemplary embodiment of the disclosure provides a memory storage apparatus including a connection interface unit, a rewritable non-volatile memory module, and a memory control circuit unit. The connection interface unit is configured to be coupled to a host system. The rewritable non-volatile memory module includes a plurality of physical units. The memory control circuit unit is coupled to the connection interface unit and the rewritable non-volatile memory module, wherein the memory control circuit unit is configured to receive a write command and determine whether the usage status of a plurality of physical units associated to a storage area among the physical units conforms to a first predetermined status, wherein the memory control circuit unit is further configured to send a write command sequence instructing to store write data corresponding to the write command to at least one physical unit associated to a temporary area among the physical units if the usage status of the physical units associated to the storage area conforms to the first predetermined status, wherein the memory control circuit unit is further configured to associate the least one physical unit storing the write data to the storage area, wherein the memory control circuit unit is further configured to allocate at least one logical unit to map the at least one physical unit associated to the storage area.

Another exemplary embodiment of the disclosure provides a memory management method configured for a rewritable non-volatile memory module, wherein the rewritable non-volatile memory module includes a plurality of physical units, and the memory management method includes: allocating a plurality of logical units to map a plurality of physical units associated to a storage area among the physical units; receiving an operation command and determining whether the usage status of the physical units associated to the storage area conforms to a second predetermined status; changing at least one physical unit of the physical units associated to the storage area to be associated to a temporary area instead if the usage status of the physical units associated to the storage area conforms to the second predetermined status; and removing a logical-to-physical mapping relationship corresponding to the at least one physical unit changed to be associated to the temporary area instead.

Another exemplary embodiment of the disclosure provides a memory control circuit unit configured to control a rewritable non-volatile memory module, wherein the rewritable non-volatile memory module includes a plurality of physical units, and the memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface, wherein the memory management circuit is configured to allocate a plurality of logical units to map a plurality of physical units associated to the storage area among the physical units, wherein the memory management circuit is further configured to receive an operation command and determine whether the usage status of the physical units associated to the storage area conforms to a second predetermined status, wherein the memory management circuit is further configured to change at least one physical unit of the physical units associated to the storage area to be associated to a temporary area instead if the usage status of the physical units associated to the storage area conforms to the second predetermined status, wherein memory management circuit is further configured to remove a logical-to-physical mapping relationship corresponding to the at least one physical unit changed to be associated to the temporary area instead.

Another exemplary embodiment of the disclosure provides a memory storage apparatus including a connection interface unit, a rewritable non-volatile memory module, and a memory control circuit unit. The connection interface unit is configured to be coupled to a host system. The rewritable non-volatile memory module includes a plurality of physical units. The memory control circuit unit is coupled to the connection interface unit and the rewritable non-volatile memory module, wherein the memory control circuit unit is configured to allocate a plurality of logical units to map a plurality of physical units associated to the storage area among the physical units, wherein the memory control circuit unit is further configured to receive an operation command and determine whether the usage status of the physical units associated to the storage area conforms to a second predetermined status, wherein the memory control circuit unit is further configured to change at least one physical unit of the physical units associated to the storage area to be associated to a temporary area instead if the usage status of the physical units associated to the storage area conforms to the second predetermined status, wherein the memory control circuit unit is further configured to remove a logical-to-physical mapping relationship corresponding to the at least one physical unit changed to be associated to the temporary area instead.

Based on the above, in the disclosure, the respective capacities of the temporary area and the storage area in the rewritable non-volatile memory module can be dynamically changed, so as to improve the data access speed of the rewritable non-volatile memory module in the case of limited overall storage capacity of the rewritable non-volatile memory module.

It may be understood, however, that this Summary may not contain all of the aspects and embodiments of the disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
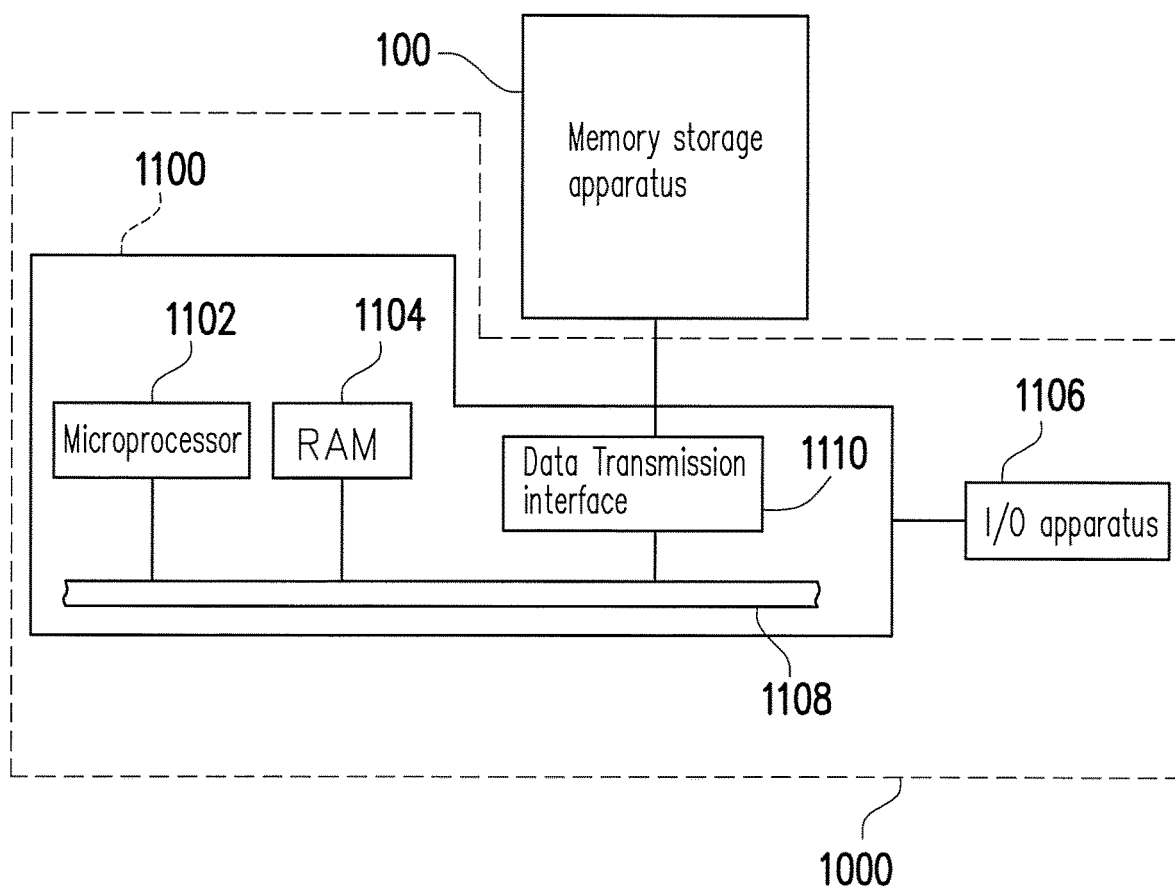
FIG. 1A is a host system and a memory storage apparatus illustrated according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1B:
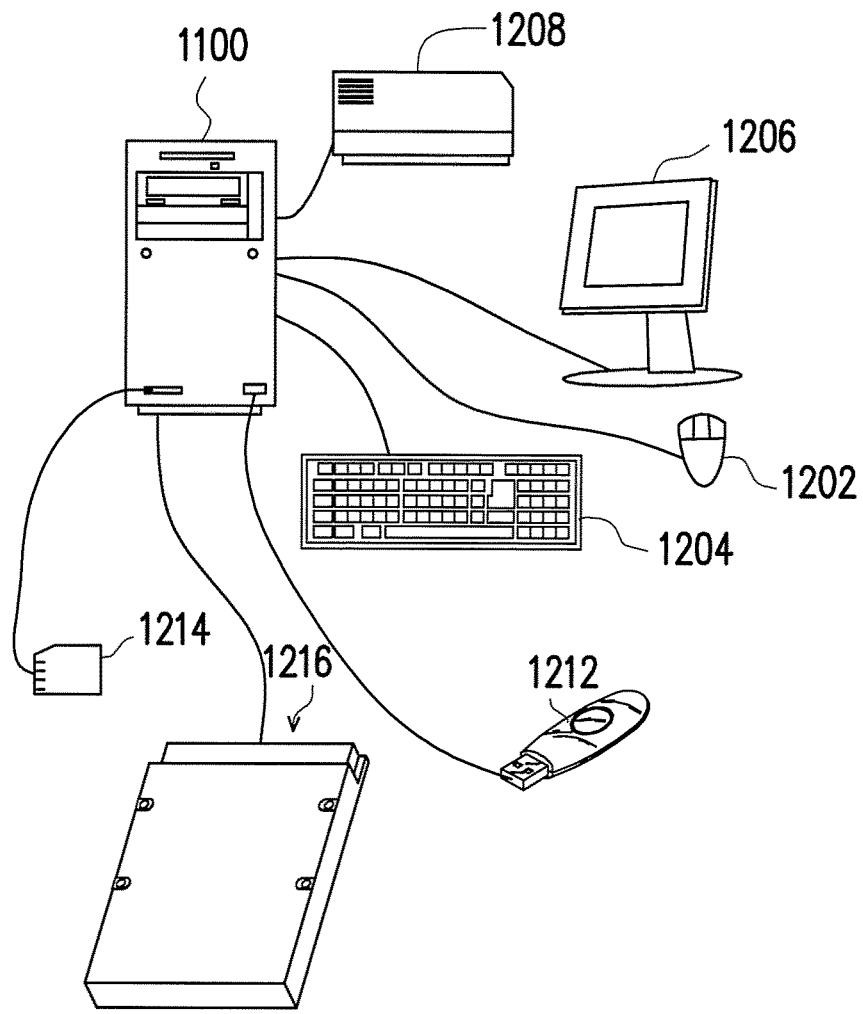
FIG. 1B is a schematic of a computer, an input/output apparatus, and a memory storage apparatus illustrated according to an exemplary embodiment of the disclosure.
Figure 1C:
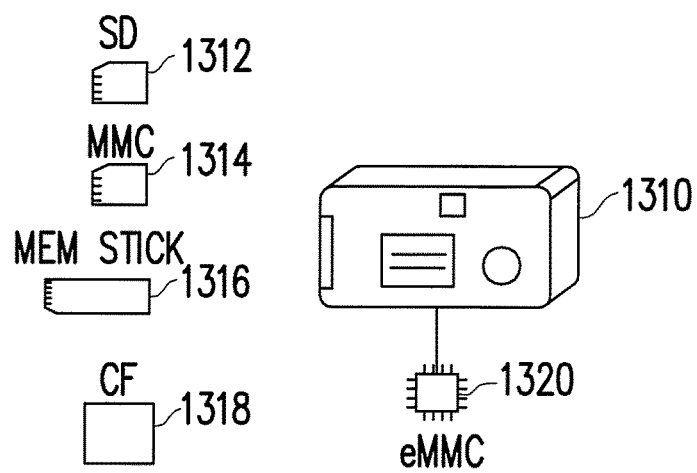
FIG. 1C is a schematic of a host system and a memory storage apparatus illustrated according to an exemplary embodiment of the disclosure.

FIG. 1A is a schematic of a host system and a memory storage apparatus illustrated according to an exemplary embodiment of the disclosure. FIG. 1B is a schematic of a computer, an input/output apparatus, and a memory storage apparatus illustrated according to an exemplary embodiment of the disclosure. FIG. 1C is a schematic of a host system and a memory storage apparatus illustrated according to an exemplary embodiment of the disclosure.

Referring to FIG. 1A, a host system 1000 generally includes a computer 1100 and an input/output (I/O) apparatus 1106. The computer 1100 includes a microprocessor 1102, a random access memory (RAM) 1104, a system bus 1108, and a data transmission interface 1110. The I/O apparatus 1106 includes a mouse 1202, a keyboard 1204, a display 1206, and a printer 1208 as shown in FIG. 1B. It may be understood that the apparatus shown in FIG. 1B is not limited to the I/O apparatus 1106, and the I/O apparatus 1106 can further include other apparatuses.

In an exemplary embodiment of the disclosure, the memory storage apparatus 100 is coupled to the other devices of the host system 1000 via the data transmission interface 1110. Via the operations of the microprocessor 1102, the random access memory (RAM) 1104, and the input/output (I/O) apparatus 1106, data can be written in the memory storage apparatus 100 or read from the memory storage apparatus 100. For instance, the memory storage apparatus 100 can be a rewritable non-volatile memory storage apparatus such as a flash drive 1212, a memory card 1214, or a solid state drive (SSD) 1216 as shown in FIG. 1B.

In general, the host system 1000 can be any system that can substantially store data with the memory storage apparatus 100. Although the host system 1000 is described as a computer system in the present exemplary embodiment, in another exemplary embodiment of the disclosure, the host system 1000 can be a system such as a digital camera, a video camera, a communication apparatus, an audio player, or a video player. For instance, when the host system is a digital camera (video camera) 1310 in FIG. 1C, the rewritable non-volatile memory storage apparatus is an SD card 1312, an MMC card 1314, a memory stick 1316, a CF card 1318, or an embedded storage apparatus 1320 (as shown in FIG. 1C) used by the digital camera (video camera) 1310. The embedded storage apparatus 1320 includes an embedded MMC (eMMC). It may be mentioned that the eMMC is directly coupled to a substrate of the host system.

Figure 2:
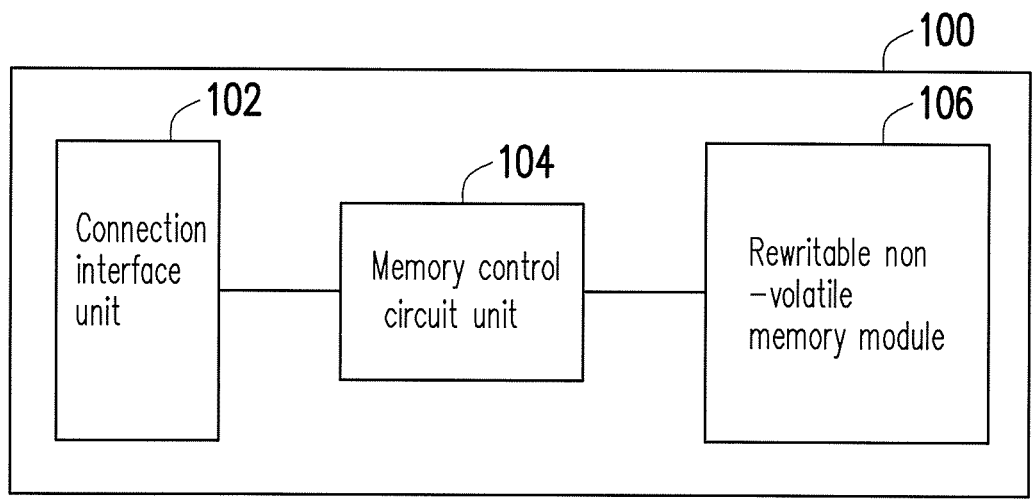
FIG. 2 is a schematic block diagram illustrating the memory storage apparatus shown in FIG. 1A.

FIG. 2 is a schematic block diagram illustrating the memory storage apparatus shown in FIG. 1A.

Referring to FIG. 2, the memory storage apparatus 100 includes a connection interface unit 102, a memory control circuit unit 104, and a rewritable non-volatile memory module 106.

In the present exemplary embodiment, the connection interface unit 102 is compatible with the serial advanced technology attachment (SATA) standard. However, it may be understood that, the disclosure is not limited thereto, and the connection interface unit 102 can also compatible with the parallel advanced technology attachment (PATA) standard, Institute of Electrical and Electronic Engineers (IEEE) 1394 standard, peripheral component interconnect express (PCI express) interface standard, universal serial bus (USB) standard, ultra high speed-I (UHS-I) interface standard, ultra high speed-II (UHS-II) interface standard, secure digital (SD) interface standard, memory stick (MS) interface standard, multi media card (MMC) interface standard, compact flash (CF) interface standard, integrated device electronics (IDE) interface standard, or other suitable standards. In the present exemplary embodiment, the connection interface unit 102 can be packaged with the memory control circuit unit 104 in one chip or be disposed outside a chip containing the memory control circuit unit 104.

The memory control circuit unit 104 is configured to execute a plurality of logic gates or control commands implemented in a hardware form or in a firmware form. The memory control circuit unit 104 also performs data operations such as writing, reading, erasing, and merging in the rewritable non-volatile memory storage module 106 according to the commands of the host system 1000.

The rewritable non-volatile memory module 106 is coupled to the memory control circuit unit 104 and is configured to store data written by the host system 1000. The rewritable non-volatile memory module 106 has a plurality of physical erasing units. For instance, the physical erasing units can belong to the same memory die or different memory dies. Each of the physical erasing units has a plurality of physical programming units. For instance, in the present exemplary embodiment, each of the physical erasing units contains 258 physical programming units, and a plurality of physical programming units belonging to the same physical erasing unit can be independently written and erased at the same time. However, it may be understood that, the disclosure is not limited thereto. For instance, in another exemplary embodiment, each of the physical erasing units can also be formed by 64 physical programming units, 256 physical programming units, or any other number of physical programming units.

More specifically, the physical erasing unit is the smallest unit of erasing. That is, each of the physical erasing units contains the smallest number of memory cells erased together. The physical programming unit is the smallest unit of programming. That is, the physical programming unit is the smallest unit of data writing. For instance, one physical programming unit can be one physical page or one physical sector. If the physical programming unit is a physical page, then each of the physical programming units generally includes a data bit area and a redundant bit area. The data bit area is configured to store user data, and the redundant bit area is configured to store system data (for instance, control information and error-correcting code). In the present exemplary embodiment, the data bit area of each of the physical programming units contains 4 physical access addresses, and the size of one physical access address is 512 bytes (B). One physical access address can also be regarded as one physical sector. However, in other exemplary embodiments, the data bit area can also contain a greater or lesser number of physical access addresses, and the disclosure does not limit the size and the number of the physical access address.

In the present exemplary embodiment, the rewritable non-volatile memory module 106 is a trinary level cell (TLC) NAND flash memory module (i.e., a flash memory module for which one memory cell can store three bit data). However, the disclosure is not limited thereto. In another exemplary embodiment, the rewritable non-volatile memory module 106 can also be a multi-level cell (MLC) NAND flash memory module (i.e., a flash memory module for which one memory cell can store two bit data), a single-level cell (SLC) NAND flash memory module (i.e., a flash memory module for which one memory cell can store one bit data), other flash memory modules, or other memory modules having the same characteristics.

Each of the memory cells in the SLC NAND flash memory module can store one bit data (i.e., "1" or "0"). In the SLC NAND flash memory, a plurality of memory cells arranged on the same word line can correspond to one physical programming unit.

Each of the memory cells in the MLC NAND flash memory module can store two bit data (i.e., "11", "10", "01" or "00"). The two bit data include one least significant bit (LSB) and one most significant bit (MSB). For instance, in the two bit data, the first bit from the left is LSB, and the second bit from the left is MSB. In the MLC NAND flash memory, a plurality of memory cells arranged on the same word line can correspond to two physical programming units. For instance, a physical programming unit composed of the LSB of the memory cells can be referred to as a lower physical programming unit, and a physical programming unit composed of the MSB of the memory cells can be referred to as an upper physical programming unit.

Each of the memory cells in the TLC NAND flash memory module can store three bit data (i.e., "111", "110", "101", "100", "011", "010", "001", or "000").

Figure 3A:
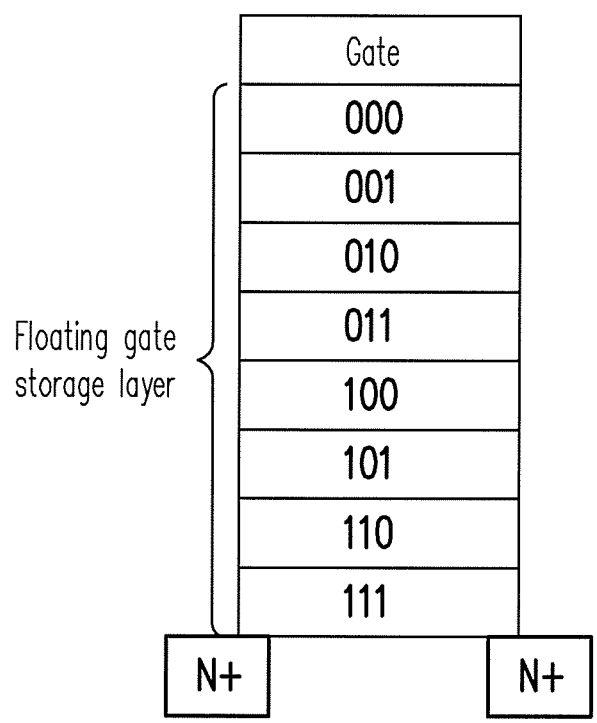
FIG. 3A and FIG. 3B are exemplary schematics of a memory cell storage architecture and a physical programming unit illustrated according to an exemplary embodiment of the disclosure.
Figures 3B, 4:
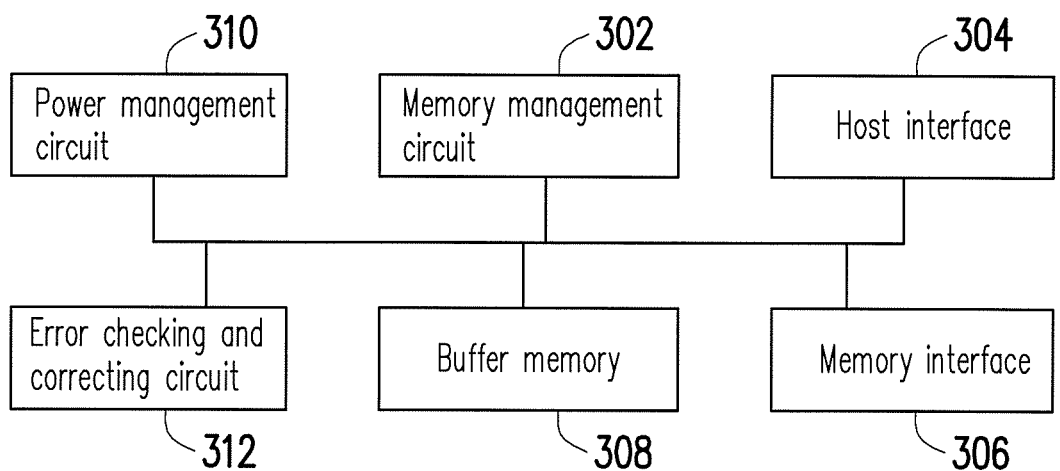
FIG. 4 is a schematic block diagram of a memory control circuit unit illustrated according to an exemplary embodiment of the disclosure.

FIG. 3A and FIG. 3B are schematics of the memory cell storage architecture and the physical programming unit of a TLC NAND flash memory module illustrated according to an exemplary embodiment of the disclosure.

Referring to FIG. 3A, in the case of a TLC NAND flash memory module, the storage status of each of the memory cells can be identified as "111", "110", "101", "100", "011", "010", "001", or "000". In each of the storage statuses, the first bit from the left is also referred to as LSB, the second bit from the left is also referred to as central significant bit (CSB), and the third bit from the left is also referred to as MSB. In the TLC NAND flash memory, a plurality of memory cells arranged on the same word line can correspond to three physical programming units. For instance, a physical programming unit composed of the LSB of the memory cells is referred to as a lower physical programming unit, a physical programming unit composed of the CSB of the memory cells is referred to as a middle physical programming unit, and a physical programming unit composed of the MSB of the memory cells is referred to as an upper physical programming unit.

Referring to FIG. 3B, in the present exemplary embodiment, one physical erasing unit includes 86 physical programming unit sets. Each of the physical programming unit sets includes a lower physical programming unit, a middle physical programming unit, and an upper physical programming unit composed of a plurality of memory cells arranged on the same word line. For ease of explanation, each of the physical programming units in FIG. 3B is assigned one number. For instance, the number N is used to represent that one corresponding physical programming unit is the Nth physical programming unit in one particular physical erasing unit. In the present exemplary embodiment, N can be any one of 0 to 257. In another exemplary embodiment, N can be a greater positive integer. In the present exemplary embodiment, the 0th physical programming unit belonging to the lower physical programming unit, the 1st physical programming unit belonging to the middle physical programming unit, and the 2nd physical programming unit belonging to the upper physical programming unit are regarded as one physical programming unit set. Similarly, the 3rd, 4th, and 5th physical programming units are regarded as one physical programming unit set, and the other physical programming units are also divided into a plurality of physical programming unit sets in the same manner. However, in another exemplary embodiment, each of the physical programming units can also be independently managed, and physical programming unit set may not to be configured. Alternatively, in another exemplary embodiment, the grouping method of the physical programming unit sets can also be changed. For instance, in another exemplary embodiment of FIG. 3B, the 0th to 5th physical programming unit can also be grouped into the same physical programming unit set, and the disclosure is not limited thereto. Moreover, writing data to one particular physical programming unit is also referred to as programming the physical programming unit. In another exemplary embodiment, one physical erasing unit can include more or less physical programming unit sets.

FIG. 4 is a schematic block diagram of a memory control circuit unit illustrated according to an exemplary embodiment of the disclosure. It may be understood that, the memory control circuit unit illustrated in FIG. 4 is merely an example, the disclosure is not limited thereto.

Referring to FIG. 4, the memory control circuit unit 104 includes a memory management circuit 302, a host interface 304, and a memory interface 306.

The memory management circuit 302 is configured to control the overall operation of the memory control circuit unit 104. Specifically, the memory management circuit 302 has a plurality of control commands. During the operation of the memory storage apparatus 100, the control commands are executed to perform data operations such as writing, reading, erasing, and merging. The following description of the memory management circuit 302 is the same as the description of the memory control circuit unit 104.

In an exemplary embodiment of the disclosure, the control commands of the memory management circuit 302 are implemented in a firmware form. For instance, the memory management circuit 302 has a microprocessor unit (not shown) and a read-only memory (not shown), and the control commands are burned into the read-only memory. During the operation of the memory storage apparatus 100, the control commands are executed by the microprocessor unit to perform data operations such as writing, reading, erasing, and merging.

In another exemplary embodiment of the disclosure, the control commands of the memory management circuit 302 can also be stored in the form of program codes in a specific area (for instance, the system area in a memory module exclusively configured to store system data) of the rewritable non-volatile memory module 106. Moreover, the memory management circuit 302 has a microprocessor unit (not shown), a read-only memory (not shown), and a random-access memory (not shown). In particular, the read-only memory has an activation code, and when the memory control circuit unit 104 is enabled, the microprocessor unit first executes the activation code to load the control commands stored in the rewritable non-volatile memory module 106 into the random-access memory of the memory management circuit 302. Next, the control commands are executed by the microprocessor unit to perform data operations such as writing, reading, erasing, and merging.

Further, in another exemplary embodiment of the disclosure, the control commands of the memory management circuit 302 can also be implemented in a hardware form. For instance, the memory management circuit 302 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. In particular, the memory cell management circuit is configured to manage the physical erasing units of the rewritable non-volatile memory module 106; the memory write circuit is configured to issue a write command to the rewritable non-volatile memory module 106 to write data into the rewritable non-volatile memory module 106; the memory read circuit is configured to issue a read command to the rewritable non-volatile memory module 106 to read data from the rewritable non-volatile memory module 106; the memory erase circuit is configured to issue an erase command to the rewritable non-volatile memory module 106 to erase data from the rewritable non-volatile memory module 106; and the data processing circuit is configured to process data to be written in the rewritable non-volatile memory module 106 and data read from the rewritable non-volatile memory module 106.

The host interface 304 is coupled to the memory management circuit 302 and is configured to receive and identify commands and data sent by the host system 1000. In other words, the commands and the data sent by the host system 1000 are transmitted to the memory management circuit 302 via the host interface 304. In the present exemplary embodiment, the host interface 304 is compatible with the SATA standard. However, it may be understood that the disclosure is not limited thereto, and the host interface 304 can also be compatible with the PATA standard, IEEE 1394 standard, PCI Express standard, USB standard, UHS-I standard, UHS-II standard, SD standard, MS standard, MMC standard, CF standard, IDE standard, or other suitable data transmission standards.

The memory interface 306 is coupled to the memory management circuit 302 and is configured to access the rewritable non-volatile memory module 106. In other words, data to be written in the rewritable non-volatile memory module 106 is converted to a format acceptable to the rewritable non-volatile memory module 106 via the memory interface 306. Specifically, if the memory management circuit 302 is to access the rewritable non-volatile memory module 106, the memory interface 306 sends a corresponding command sequence. For instance, the command sequences can include a write command sequence instructing data writing, a read command sequence instructing data reading, an erase command sequence instructing data erasing, and corresponding command sequences configured to instruct various memory operations (such as changing read voltage level or executing garbage collection procedure), which are not repeated herein. The command sequences are generated by, for instance, the memory management circuit 302 and transmitted to the rewritable non-volatile memory module 106 via the memory interface 306. The command sequences can include one or a plurality of signals or data on a bus. The signals or data can include a command code or a program code. For instance, in a read command sequence, information such as read identification code or memory address is included.

In an exemplary embodiment of the disclosure, the memory control circuit unit 104 further includes a buffer memory 308, a power management circuit 310, and an error checking and correcting circuit 312.

The buffer memory 308 is coupled to the memory management circuit 302 and is configured to temporarily store data or commands from the host system 1000 or data from the rewritable non-volatile memory module 106.

The power management circuit 310 is coupled to the memory management circuit 302 and is configured to control the power of the memory storage apparatus 100.

The error checking and correcting circuit 312 is coupled to the memory management circuit 302 and is configured to execute an error checking and correcting procedure to ensure the correctness of data. Specifically, when the memory management circuit 302 receives a write command from the host system 1000, the error checking and correcting circuit 312 generates a corresponding error checking and correcting code (ECC) and/or an error detecting code (EDC) for the data corresponding to the write command, and the memory management circuit 302 writes the data corresponding to the write command and the corresponding ECC and/or EDC in the rewritable non-volatile memory module 106. Next, when reading data from the rewritable non-volatile memory module 106, the memory management circuit 302 reads the ECC and/or the EDC corresponding to the data at the same time, and the error checking and correcting circuit 312 executes an error checking and correcting procedure on the read data based on the ECC and/or the EDC.

Figure 5:
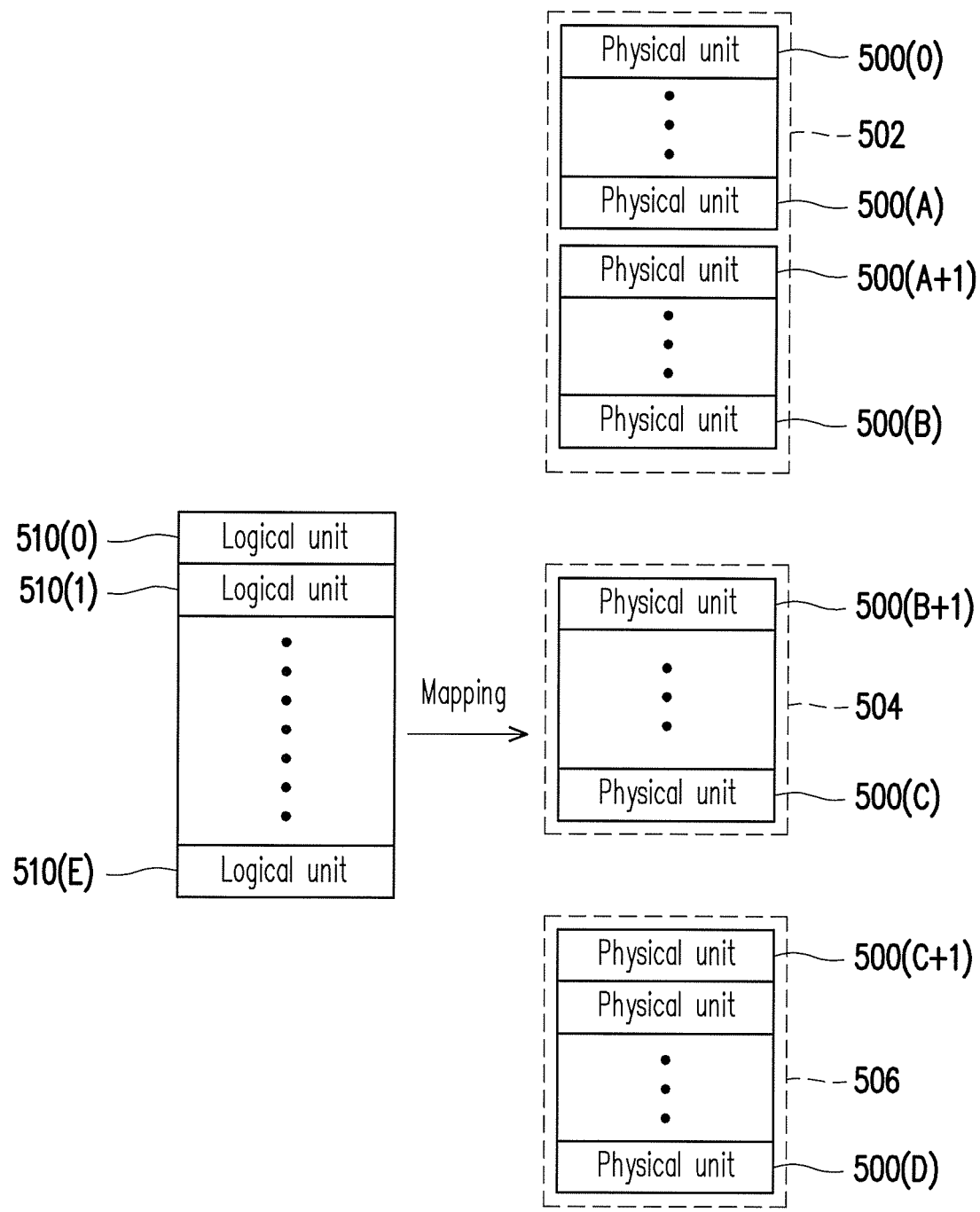
FIG. 5 is a schematic block diagram of a rewritable non-volatile memory module illustrated according to an exemplary embodiment of the disclosure.

FIG. 5 is a schematic block diagram of the management of a rewritable non-volatile memory module illustrated according to an exemplary embodiment of the disclosure. Terms such as "grouping" and "associating" recited in the following exemplary embodiments are logical concepts, the actual locations of the physical units of the rewritable non-volatile memory module 106 are not changed, and instead operation is logically performed on the physical units of the rewritable non-volatile memory module 106. In the following exemplary embodiments, one physical unit can refer to one physical address, one physical sector, one physical programming unit, or one physical erasing unit. The disclosure does not limit the size of one physical unit. In the following exemplary embodiments, grouping one particular physical unit to one particular area can also be referred to as associating the particular physical unit to the particular area. Moreover, in the following exemplary embodiments, a physical unit associated to one particular area can be regarded as a physical unit belonging to the area; and storing, temporarily storing, copying, or moving one particular data to a physical unit belonging to one particular area can also be regarded as storing, temporarily storing, copying, or moving the data to the area.

Referring to FIG. 5, in the present exemplary embodiment, before a user begins using the memory storage apparatus 100 (such as during the initialization procedure of the memory storage apparatus 100 or before the memory storage apparatus 100 leaves the factory), the memory management circuit 302 logically groups physical units 500(0) to 500(D)

of the rewritable non-volatile memory module 106 into a plurality of areas according to a predetermined rule, such as a temporary area 502, a storage area 504, and a system area 506. For instance, physical units 500(0) to 500(A) and 500(A+1) to 500(B) (also referred to as 500(0) to 500(B) in the following) are associated to the temporary area 502, physical units 500(B+1) to 500(C) are associated to the storage area 504, and physical units 500(C+1) to 500(D) are associated to the system area 506.

The physical units belonging to the temporary area 502 are configured to temporarily store data from the host system 1000. The physical units belonging to the storage area 504 are configured to store data from the host system 1000. Valid data and invalid data are stored in the storage area 504. For instance, when the host system 1000 is to delete valid data (such as user data in the storage area 504), the deleted data may still be stored in the storage area 504, but is marked as invalid data. A physical unit in which valid data is not stored are also referred to as spare physical unit. For instance, erased physical units become spare physical units. The physical units belonging to the system area 506 are configured to record system data, wherein the system data includes, for instance, the manufacturer and the model relating to a memory chip, the number of physical erasing units of the memory chip, and the number of physical programming units of each of the physical erasing units.

In general, if the host system 1000 is to store one particular data in the rewritable non-volatile memory module 106, the data is first temporarily stored in the temporary area 502. Then, the data is moved from the temporary area 502 to the storage area 504. In other words, under normal use conditions, the final storage location of the data is the storage area 504, not the temporary area 502. Moreover, data temporarily stored in the temporary area 502 can also be configured as backup in the case in which data fails to be written in the storage area 504. For instance, after one particular data is temporarily stored in the temporary area 502, the data may be continuously maintained in the temporary area 502 until the data is successfully moved from the temporary area 502 to the storage area 504.

If damage occurs to the physical units in the temporary area 502, the storage area 504, or the system area 506, available physical units in the rewritable non-volatile memory module 106 can also be configured to replace the damaged physical units. Available physical units configured to replace damaged physical units can belong to the temporary area 502, the storage area 504, or the system area 506. For instance, when one particular physical unit belonging to the system area 506 is damaged and is replaced by one available physical unit belonging to the storage area 504, the physical unit originally belonging to the storage area 504 is associated to the system area 506. If none of the physical units in the physical units 500(B+1) to 500(C) and 500(C+1) to 500(D) is damaged, then the physical units 500(B+1) to 500(C) are maintained to be associated to the storage area 504, and the physical units 500(C+1) to 500(D) are maintained to be associated to the system area 506. If available physical units configured to replace damaged physical units are insufficient, then the memory management circuit 302 may declare the entire memory storage apparatus 100 to be in a write protect status, and no additional data can be written.

It may be mentioned that, in the present exemplary embodiment, even if none of the physical units 500(0) to 500(B) is damaged, the association relationship of each of the physical units 500(0) to 500(B) to the temporary area 502 or the storage area 504 can still be dynamically changed. For instance, during the initial period of the memory storage apparatus 100, the physical units 500(0) to 500(B) are first associated to the temporary area 502 to increase the capacity of the temporary area 502; if more user data is stored in the storage area 504, at least a portion of the physical units 500(0) to 500(B) can be changed to be associated to the storage area 504 instead; moreover, if some user data in the rewritable non-volatile memory module 106 is deleted, at least a portion of the physical units 500(0) to 500(B) associated to the storage area 504 can also be associated to the temporary area 502 again.

In the present exemplary embodiment, each of the physical units 500(0) to 500(B) is also referred to as one predetermined physical unit. In comparison to the available physical units configured to replace damaged physical units that can be associated to any area that the damaged physical units belong, the association relationship of each of the predetermined physical units is limited to dynamically change between the temporary area 502 and the storage area 504. Moreover, the physical units 500(B+1) to 800(C) and 500(C+1) to 500(D) are not predetermined physical units.

The memory management circuit 302 allocates logical units 510(0) to 510(E) to map physical units associated to the storage area 504. For instance, each of the physical units in the storage area 504 storing valid data is mapped by at least one logical unit; if one particular physical unit belonging to the storage area 504 only stores invalid data or does not store any data, then the physical unit is not mapped by any logical unit. Each of the logical units 510(0) to 510(E) can be mapped to one or a plurality of physical units. In the present exemplary embodiment, each of the logical units 510(0) to 510(E) includes 258 logical addresses. However, in another exemplary embodiment, each of the logical units 510(0) to 510(E) can also contain more or less logical addresses.

The memory management circuit 302 records the mapping relationship between the logical units and the physical units (also referred to as logical-to-physical mapping relationship) to at least one logical-to-physical mapping table. When the host system 1100 is to read data from the memory storage apparatus 100 or write data to the memory storage apparatus 100, the memory management circuit 302 can execute data access on the memory storage apparatus 100 according to the logical-to-physical mapping table.

In the present exemplary embodiment, the rewritable non-volatile memory module 106 is a TLC NAND flash memory module. However, in another exemplary embodiment, the rewritable non-volatile memory module 106 can also be an MLC NAND flash memory module.

In the present exemplary embodiment, the physical units 500(0) to 500(B) are operated in a single-page mode, and the physical units 500(B+1) to 500(C) are operated in a multi-page mode.

In the single-page mode, each of the programmed memory cells can only store bit data (also referred to as first bit data in the following) of a first number. For instance, the first number is "1". For instance, only the lower physical programming units are configured to store the first bit data. In particular, although each of the memory cells in the SLC NAND flash memory module and each of the memory cells in the TLC or MLC NAND flash memory module storing data using the single-page mode is configured to store one bit data, the programming voltage (also referred to as write voltage) configured to program the memory cells in the TLC or MLC NAND flash memory module using the single-page mode may be different from the programming voltage configured to program the memory cells in the SLC NAND flash memory module.

In the multi-page mode, each of the memory cells can store bit data of a second number (also referred to as second bit data in the following). The second number is greater than the first number. For instance, the second number is "2" or "3". For instance, if the rewritable non-volatile memory module 106 is a TLC NAND flash memory module, the lower physical programming units, the middle physical programming units, and the upper physical programming units of a plurality of memory cells operated in the multi-page mode can all be configured to store second bit data; and if the rewritable non-volatile memory module 106 is an MLC NAND flash memory module, the lower physical programming units and the upper physical programming units of a plurality of memory cells operated in the multi-page mode can all be configured to store second bit data.

In other words, although the rewritable non-volatile memory module 106 is a TLC or MLC NAND flash memory module, the "actually" available capacity of each of the physical units 500(B+1) to 500(C) is greater than the "actually" available capacity of each of the physical units 500(0) to 500(B) by a magnitude of 2 to 3, and each of the physical units 500(B+1) to 500(C) can be configured to store data temporarily stored in two to three physical units belonging to the temporary area 502. For ease of explanation, the "actually" available capacity of one physical unit is collectively referred to as the available capacity of the physical unit. Moreover, the data access speed and the reliability of one physical unit operated in the single-page mode are often respectively greater than the data access speed and the reliability belonging to one physical unit operated in the multi-page mode.

In the present exemplary embodiment, the total capacity (also referred to as total logical capacity in the following) of the logical units 510(0) to 510(E) is equal to a maximum capacity provided by the rewritable non-volatile memory module 106 to the host system 1000 for storing data (i.e., user data) by default. For instance, if the maximum capacity of data storage provided by the rewritable non-volatile memory module 106 to the host system 1000 by default is 120 GB (giga bytes), then the total logical capacity accessible to the host system 1000 is 120 GB.

In the present exemplary embodiment, the maximum capacity of data storage provided by the rewritable non-volatile memory module 106 to the host system 1000 by default is equal to the sum (also referred to as total available capacity in the following) of available capacity of the physical units 500(A+1) to 500(B) and 500(B+1) to 500(C). In other words, in the present exemplary embodiment, during the operation of the memory storage apparatus 100, if all of the logical units 510(0) to 510(E) store valid data, then the physical units 500(A+1) to 500(B) and 500(B+1) to 500(C) are all associated to the storage area 504 to store corresponding valid data. However, in another exemplary embodiment, the maximum capacity of data storage provided by the rewritable non-volatile memory module 106 to the host system 1000 by default may be equal to the total physical capacity of the physical units 500(0) to 500(B) and 500(B+1) to 500(C). In other words, in the present exemplary embodiment, during the operation of the memory storage apparatus 100, if all of the logical units 510(0) to 510(E) store valid data, then the physical units 500(0) to 500(B) and 500(B+1) to 500(C) are all associated to the storage area 504 to store corresponding valid data.

Figure 6:
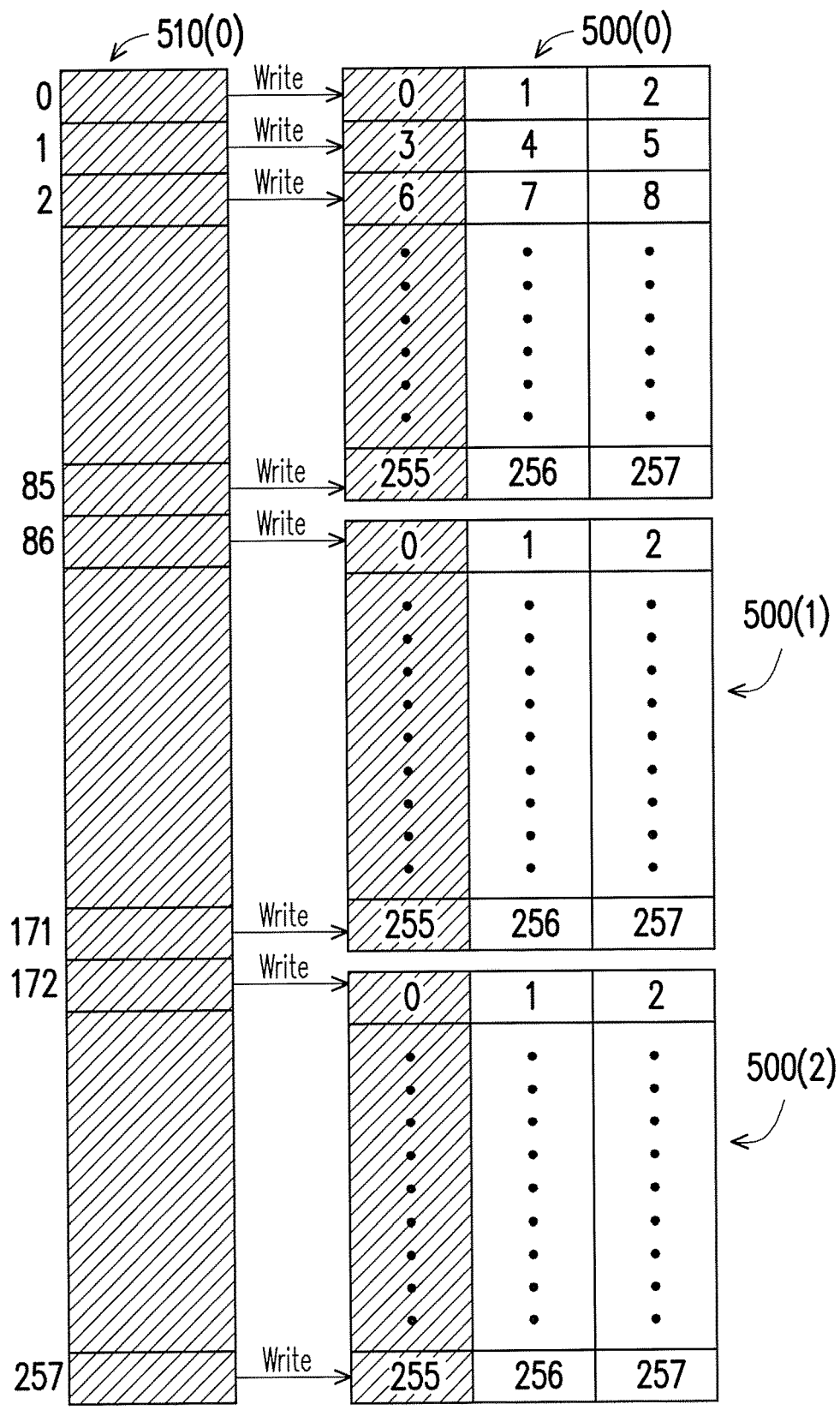
FIG. 6 and FIG. 7 are schematics of data storage illustrated according to an exemplary embodiment of the disclosure.
Figure 7:
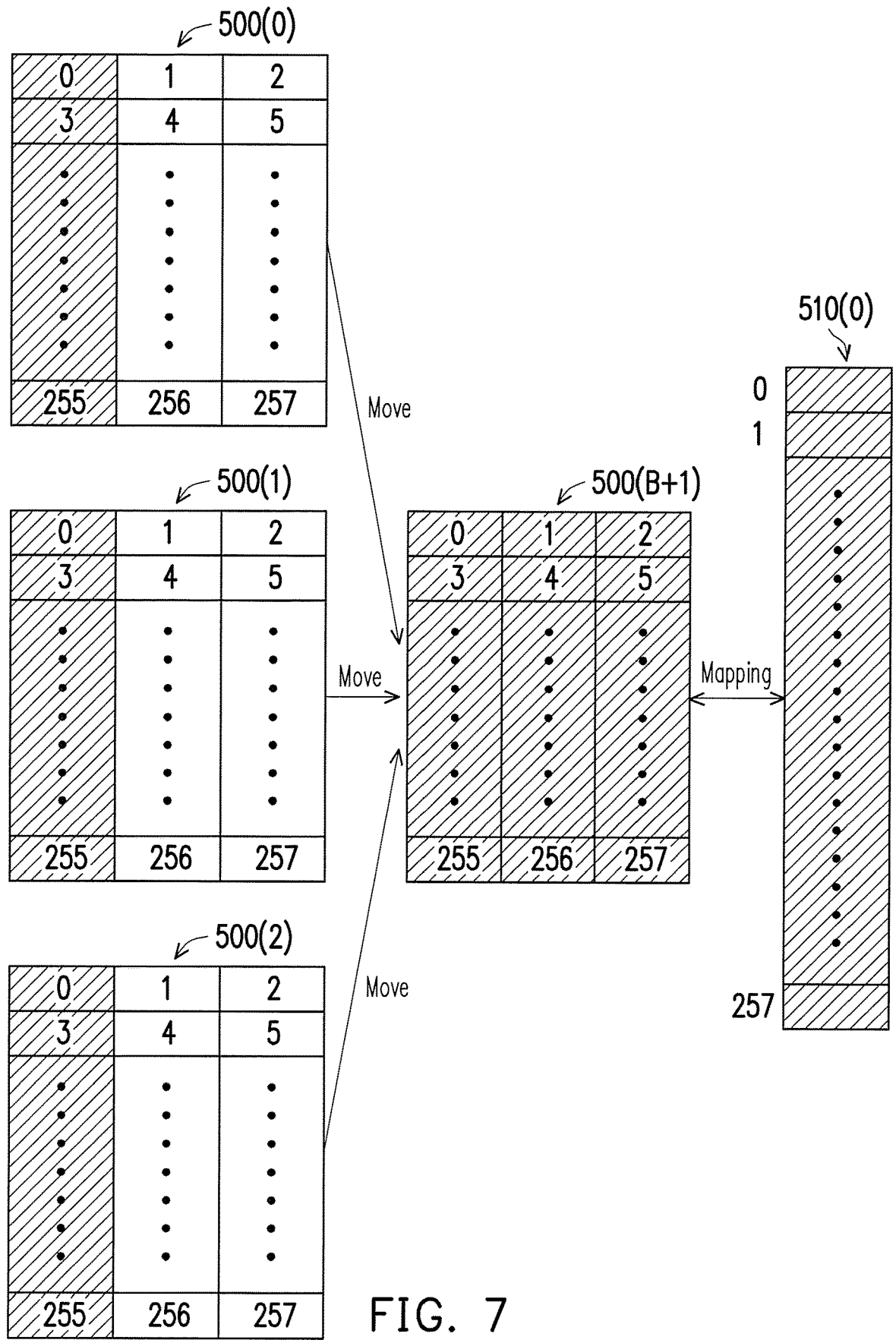

FIG. 6 and FIG. 7 are schematics of data storage illustrated according to an exemplary embodiment of the disclosure.

Referring to FIG. 6, if the memory management circuit 302 receives a write command from the host system 1000 instructing to store particular data to the logical unit 510(0), then the memory management circuit 302 first temporarily stores the data in at least one physical unit belonging to the temporary area 502. Taking temporarily storing data with data size equaling to a size of a logical unit as an example, the memory management circuit 302 can temporarily store the data in the three physical units 500(0), 500(1), and 500(2) belonging to the temporary area 502. For instance, the first portion of the data is temporarily stored in the lower physical programming units of the physical unit 500(0) labeled 0, 3, 6, . . . , 255 (shown in slash lines), the second portion of the data is temporarily stored in the lower physical programming units in the physical unit 500(1) labeled 0, 3, 6, . . . , 255 (shown in slash lines), and the third portion of the data is temporarily stored in the lower physical programming units in the physical unit 500(1) labeled 0, 3, 6, . . . , 255 (shown in slash lines), as shown in FIG. 6. If the size of the data to be stored in greater, then more physical units in the temporary area 502 can be selected and configured to temporarily store the data. After the data is temporarily stored in the physical units 500(0), 500(1), and 500(2) belonging to the temporary area 502, the memory management circuit 302 sends a response to the host system 1000. Based on the response, the host system 1000 can learn that the data transmission is complete.

Referring to FIG. 7, the memory management circuit 302 can move data from the temporary area 502 to the storage area 504 at any time or at a specific time point. For instance, in the present exemplary embodiment, the memory management circuit 302 can select one spare physical unit 500(B+1) from the storage area 504 at any time and move data to be moved in the physical units 500(0), 500(1), and 500(2) to the physical unit 500(B+1), as shown in FIG. 7 (data is shown in slash lines). Alternatively, in another exemplary embodiment, the operation of moving data from the temporary area 502 to the storage area 504 can also be executed only when the memory storage apparatus 100 is in an idle status for a period of time (such as not receiving any instructions from the host system 1000 for 30 seconds) or the amount of data of the data to be moved in the temporary area 502 exceeds a predetermined value. Moreover, the memory management circuit 302 establishes a mapping relationship between the logical unit 510(0) and the physical unit 500(B+1) in correspondence to moving and storing data in the physical unit 500(B+1).

Referring further to FIG. 5 to FIG. 7, each of the physical units 500(0), 500(1), and 500(2) can be one of the physical units 500(0) to 500(B) associated to the temporary area 502. In the case that the total available capacity of the physical units 500(0) to 500(A) is 2 G, the total available capacity of the physical units 500(A+1) to 500(B) is 1 G, and the total available capacity of the physical units 500(B+1) to 500(C) is 119 G, the initial total available capacity of the temporary area 502 is 3 GB and the initial total available capacity of the storage area 504 is 119 GB. During the operation of the memory storage apparatus 100, if all of the physical units 500(A+1) to 500(B) are changed to be associated to the storage area 504 instead, then the total available capacity of the storage area 504 is changed to 120 GB (i.e., 119+1=120), and the total available capacity of the temporary area 502 is changed to 2 GB. Moreover, at least one of the physical units 500(0) to 500(A) can also further be associated to the storage area 504. However, in other exemplary embodiments, the predetermined number/predetermined capacity of the individual physical units of the temporary area 502, the storage area 504, and the system area 506 may also be different according to different memory specifications.

Figure 8A:
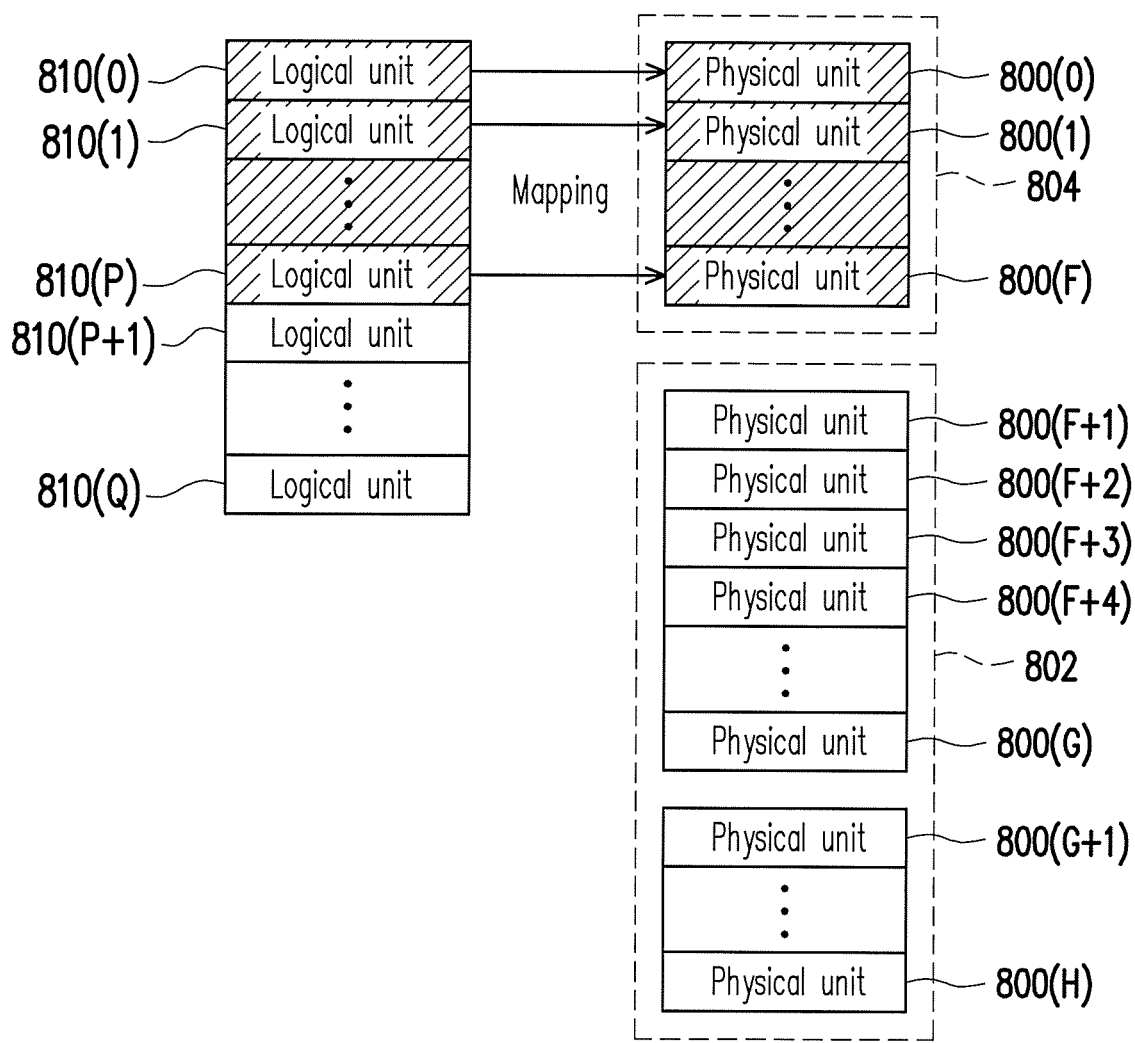
FIG. 8A and FIG. 8B are schematics of the management of physical units illustrated according to an exemplary embodiment of the disclosure.
Figure 8B:
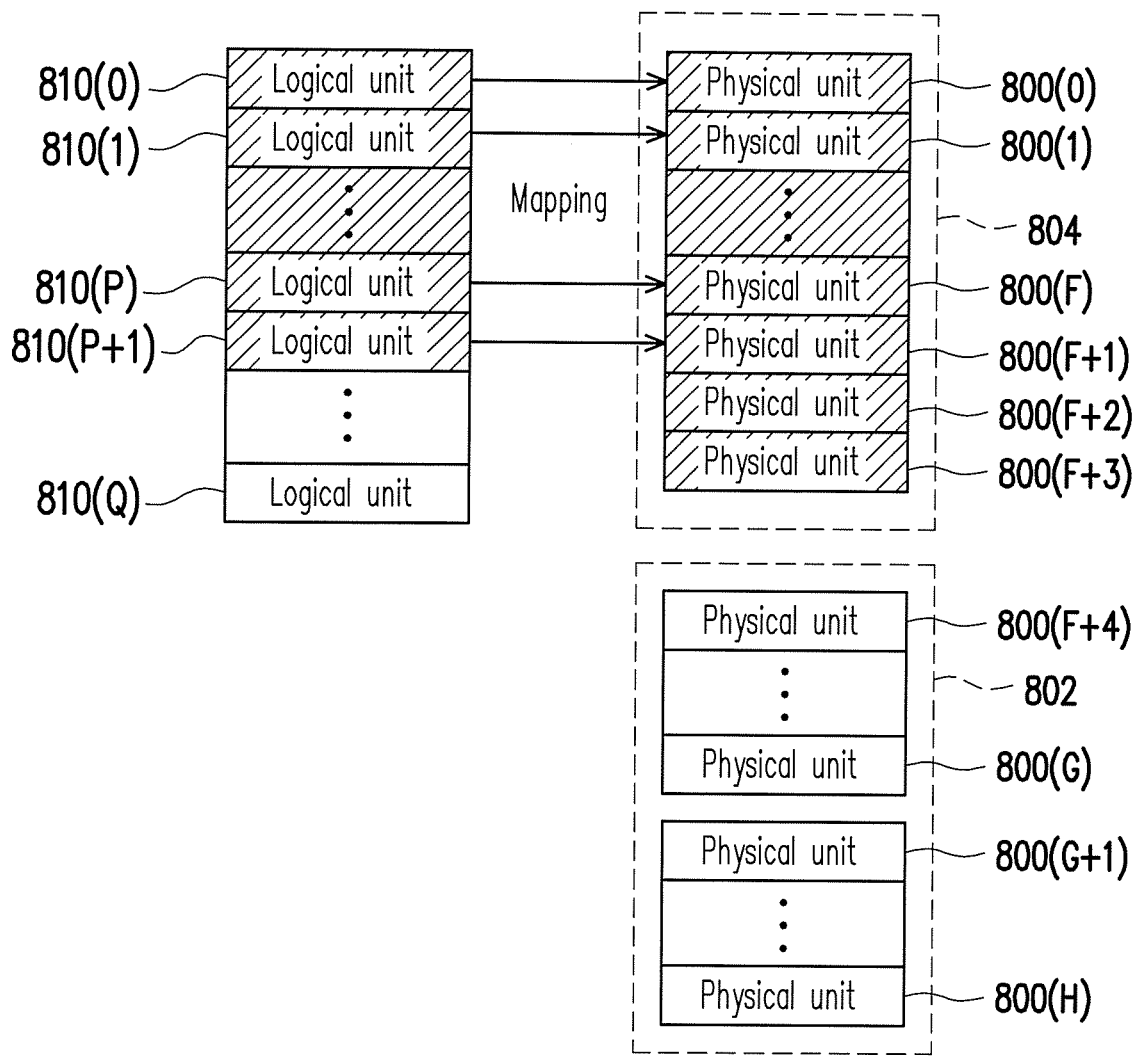

FIG. 8A and FIG. 8B are schematics of the management of physical units illustrated according to an exemplary embodiment of the disclosure.

Referring to FIG. 8A, according to a predetermined rule, physical units 800(0) to 800(F) are initially associated to a storage area 804 and physical units 800(F+1) to 800(G) and 800(G+1) to 800(H) (also referred to as physical units 800(F+1) to 800(H) in the following) are initially associated to a temporary area 802. In particular, the physical units 800(F+1) to 800(H) are predetermined physical units and the physical units 800(0) to 800(F) are not predetermined physical units. Moreover, logical units 810(0) to 810(P) are allocated by the memory management circuit 302 so as to be mapped to physical units storing valid data in the storage area 804.

The memory management circuit 302 receives a write command from the host system 1000. Based on the write command, the memory management circuit 302 determines whether the usage status of the physical units 800(0) to 800(F) conforms to a predetermined status (also referred to as first predetermined status in the following). For instance, the memory management circuit 302 can determine whether the usage capacity of the physical units 800(0) to 800(F) conforms to a predetermined capacity (also referred to as first predetermined capacity in the following). The usage capacity of the physical units 800(0) to 800(F) refers to the total data size of valid data stored in the physical units 800(0) to 800(F). For instance, the first predetermined capacity can be set to 80% to 100% or less of the total available capacity of the physical units 800(0) to 800(F). If the usage capacity of the physical units 800(0) to 800(F) is equal to or greater than the first predetermined capacity, then the memory management circuit 302 can determine that the usage capacity of the physical units 800(0) to 800(F) conforms to the first predetermined capacity. On the contrary, if the usage capacity of the physical units 800(0) to 800(F) is less than the first predetermined capacity, then the memory management circuit 302 can determine that the usage capacity of the physical units 800(0) to 800(F) does not conform to the first predetermined capacity.

If the usage capacity of the physical units 800(0) to 800(F) conforms to the first predetermined capacity, then the memory management circuit 302 can determine the usage status of the physical units 800(0) to 800(F) conforms to the first predetermined status.

Using FIG. 8A as an example, in the case that the physical units 800(0) to 800(F) are all configured to store valid data, the usage capacity of the physical units 800(0) to 800(F) reaches the first predetermined capacity (for instance, the amount of data of valid data stored in the physical units 800(0) to 800(F) reaches 100% of the total available capacity of the physical units 800(0) to 800(F)), and therefore the memory management circuit 302 instructs the rewritable non-volatile memory module 106 to store write data corresponding to the write command to at least one of the physical units 800(F+1) to 800(H) currently associated to the temporary area 802. In the present exemplary embodiment, the write data is stored into physical units 800(F+1) to 800(F+3) for illustration. However, in another exemplary embodiment, any one of the physical units in the physical units 800(F+1) to 800(H) currently associated to the temporary area 802 can be configured to store the write data.

After the write data is stored into the physical units 800(F+1) to 800(F+3), the memory management circuit 302 changes the physical units 800(F+1) to 800(F+3) to be associated to the storage area 804 instead, as shown in FIG. 8B. Moreover, the memory management circuit 302 maps a logical unit 810(P+1) for storing the write data to the physical units 800(F+1) to 800(F+3).

It may be mentioned that, after the physical units 800(F+1) to 800(F+3) are changed to be associated from the temporary area 802 to the storage area 804 instead, the total available capacity of the storage area 804 is correspondingly changed. For instance, the total available capacity of the storage area 804 is changed from a first capacity to a second capacity. In particular, the second capacity is greater than the first capacity. For instance, the first capacity is equal to the total logical capacity of the logical units 810(0) to 810(P), and the second capacity is equal to the total logical capacity of the logical units 810(0) to 810(P+1). Moreover, in another exemplary embodiment, as the amount of data of stored valid data is increased, the number of predetermined physical units changed to be associated to the storage area 804 instead each time may also be increased. For instance, in another exemplary embodiment of FIG. 8A, if one particular write data is stored in the physical units 800(F+1) to 800(F+6) currently associated to the temporary area 802 and the usage status of the physical units 800(0) to 800(F) conforms to the first predetermined status, then the physical units 800(F+1) to 800(F+6) are changed to be associated to the storage area 804 instead synchronously.

In the present exemplary embodiment, the maximum capacity provided by the rewritable non-volatile memory module 106 to the host system 1000 by default is equivalent to the total logical capacity of the logical units 810(0) to 810(Q). Therefore, even if the total available capacity of the physical units associated to the storage area 804 is changed from the first capacity to the second capacity, the total logical capacity of the logical units 810(0) to 810(Q) of the host system 1000 set corresponding to the rewritable non-volatile memory module 106 does not change.

In another exemplary embodiment of FIG. 8A, based on the received write command, if the memory management circuit 302 determines that the usage capacity of the physical units 800(0) to 800(F) does not conform to the first predetermined capacity, then the memory management circuit 302 can determine that the usage status of the physical units 800(0) to 800(F) currently associated to the storage area 804 does not conform to the first predetermined status. If the memory management circuit 302 determines that the usage status of the physical units 800(0) to 800(F) currently associated to the storage area 804 does not conform to the first predetermined status, then the memory management circuit 302 first temporarily stores the write data corresponding to the write command in at least one of the physical units 800(F+1) to 800(H) associated to the temporary area 802 and then moves the data from the temporary area 802 to the storage area 804 according to the data storage operations described in the exemplary embodiments of FIG. 6 and FIG. 7.

It may be mentioned that, when the amount of data of valid data stored in the storage area 804 is greater, more predetermined physical units initially associated to the temporary area 802 may be changed to be associated to the storage area 804 instead. In an exemplary embodiment, if the total available capacity of the physical units associated to the storage area 804 is equal to the maximum capacity provided by the rewritable non-volatile memory module 106 to the host system 1000 by default (i.e., the total logical capacity of the logical units 810(0) to 810(Q)), then the memory management circuit 302 stops associating the other predetermined physical units currently belonging to the temporary area 802 to the storage area 804.

In an exemplary embodiment, when certain conditions are met, the predetermined physical units associated to the storage area 804 can also be changed to be associated to the temporary area 802 instead.

Figure 9A:
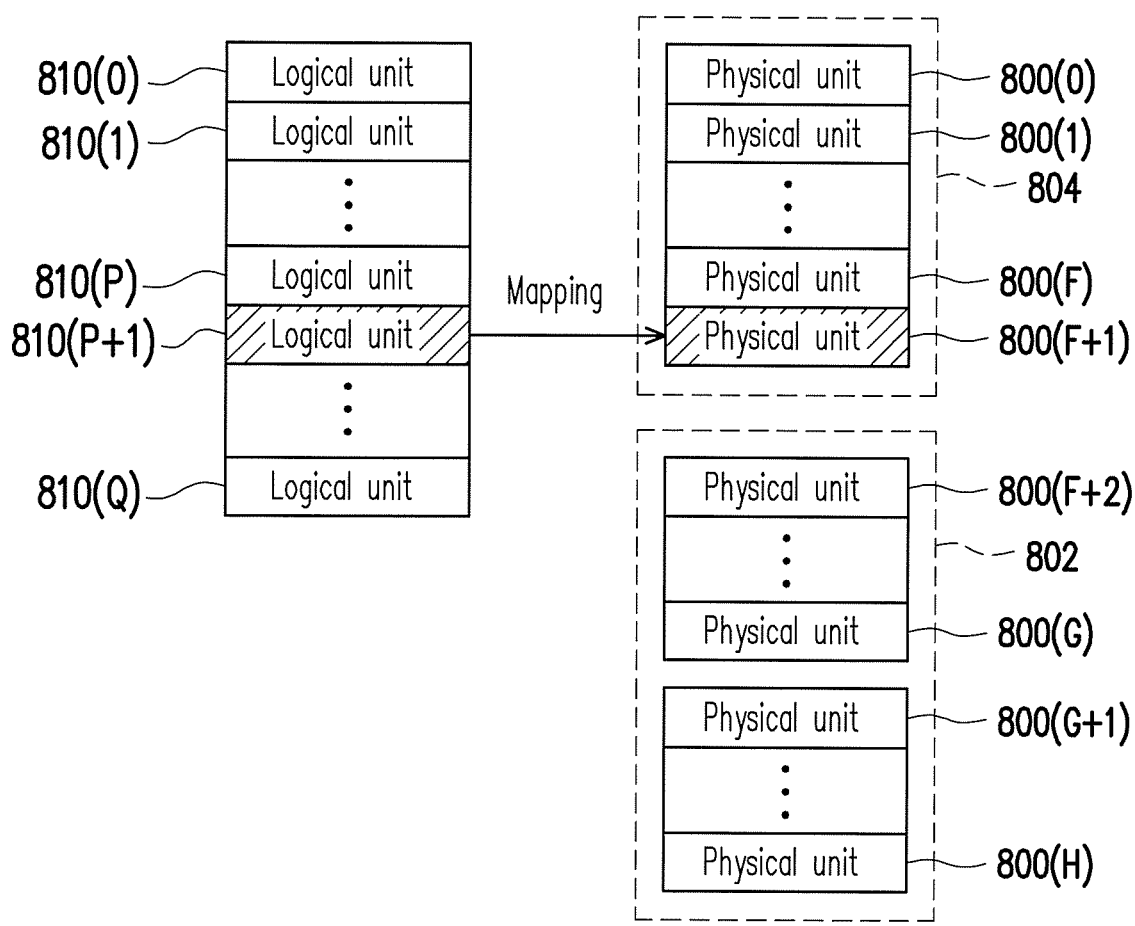
FIG. 9A and FIG. 9B are schematics of the management of physical units illustrated according to another exemplary embodiment of the disclosure.
Figure 9B:
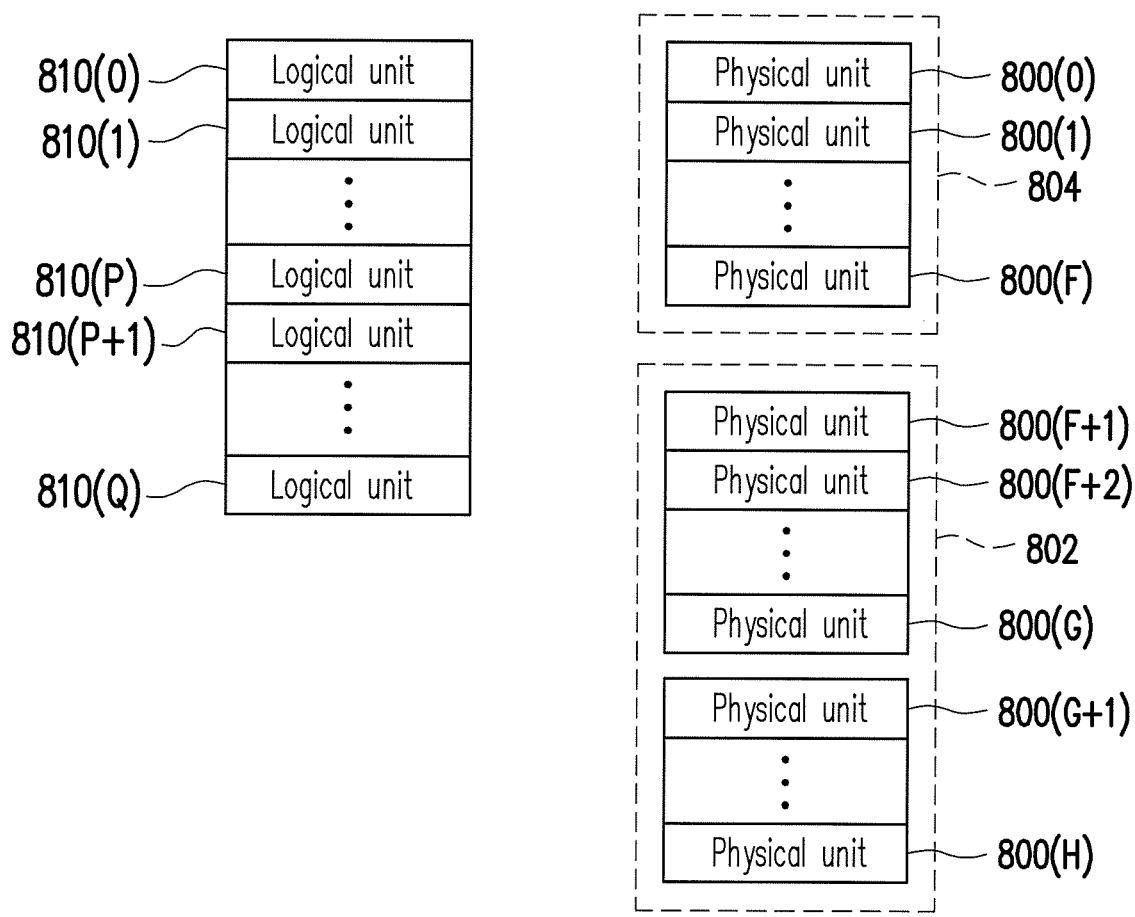

FIG. 9A and FIG. 9B are schematics of the management of physical units illustrated according to another exemplary embodiment of the disclosure.

Referring to FIG. 9A, in the present exemplary embodiment, the physical units 800(0) to 800(F+1) are associated to the storage area 804, and the physical units 800(F+2) to 800(H) are associated to the temporary area 802. In particular, the physical units 800(F+1) to 800(H) are predetermined physical units and the physical units 800(0) to 800(F) are not predetermined physical units. Moreover, in comparison to the exemplary embodiments of FIG. 8A and FIG. 8B, in the present exemplary embodiment, the data stored in the logical units 810(0) to 810(P) are all instructed to be deleted by the host system 1000, and therefore only the mapping relationship between the logical unit 810(P+1) and the physical unit 800(F+1) remains.

In the present exemplary embodiment, the memory management circuit 302 receives an operation command from the host system 1000. For instance, the operation command instructs to delete data (also referred to as first data in the following) stored in one particular logical unit. Based on the operation command, the memory management circuit 302 determines whether the usage status of the physical units 800(0) to 800(F+1) currently associated to the storage area 804 conforms to another predetermined status (also referred to as second predetermined status in the following). For instance, the memory management circuit 302 can determine whether the first data instructed to be deleted by the operation command is stored in one predetermined physical unit. In the present exemplary embodiment, if the first data is stored in the logical unit 810(P+1), then based on the mapping relationship between the logical unit 810(P+1) and the physical unit 800(F+1), the memory management circuit 302 determines the first data about to be deleted is stored in a predetermined physical unit (i.e., the physical unit 800(F+1)). If the first data about to be deleted is stored in the predetermined physical unit, then the memory management circuit 302 determines the usage status of the physical units 800(0) to 800(F+1) currently associated to the storage area 804 conforms to the second predetermined rule.

As shown in FIG. 9B, if the memory management circuit 302 determines the usage status of the physical units 800(0) to 800(F+1) currently associated to the storage area 804 conforms to the second predetermined rule, then the memory management circuit 302 instructs the rewritable non-volatile memory module 106 to delete the first data from the physical unit 800(F+1) (or marked as invalid data) and change the physical unit 800(F+1) to be associated to the temporary area 802 instead. Moreover, the memory management circuit 302 removes the logical-to-physical mapping relationship corresponding to the physical unit 800(F+1). For instance, the mapping relationship between the logical unit 810(P+1) and the physical unit 800(F+1) is removed. However, in other exemplary embodiments, if the amount of data of deleted data is greater, then more predetermined physical units can also be changed to be associated to the temporary area 802 from the storage area 804 instead. For instance, if one particular operation command instructs the deletion of data stored in three predetermined physical units currently associated to the storage area 804, then after the data is deleted, the three predetermined physical units currently associated to the storage area 804 can be changed to be associated to the temporary area 802 instead at the same time. Moreover, if the deleted first data is not stored in the particular predetermined physical unit, for instance, the first data is stored in one of the physical units 800(0) to 800(F), then the memory management circuit 302 determines the usage status of the physical units 800(0) to 800(F+1) currently associated to the storage area 804 does not conform to the second predetermined rule, and keeps the physical unit 800(F+1) associated to the storage area 804.

In another exemplary embodiment, during the operation of determining whether the usage status of the physical units 800(0) to 800(F+1) currently associated to the storage area 804 conforms to the second predetermined status, the memory management circuit 302 further determines whether the usage capacity of the physical units 800(0) to 800(F) conforms to another predetermined capacity (also referred to as second predetermined capacity in the following). The usage capacity of the physical units 800(0) to 800(F) refers to the total data size of valid data stored in the physical units 800(0) to 800(F). For instance, the memory management circuit 302 can determine whether the usage capacity of the physical units 800(0) to 800(F) is less than or equal to the second predetermined capacity. If the usage capacity of the physical units 800(0) to 800(F) is less than or equal to the second predetermined capacity and the first data about to be deleted is stored in a predetermined physical unit (such as the physical unit 800(F+1)), then the memory management circuit 302 can determine that the usage status of the physical units 800(0) to 800(F+1) currently associated to the storage area 804 conforms to the second predetermined status. On the contrary, if the usage capacity of the physical units 800(0) to 800(F) is not less than the second predetermined capacity or the first data about to be deleted is not stored in the predetermined physical unit, then the memory management circuit 302 determines that the usage status of the physical units 800(0) to 800(F+1) currently associated to the storage area 804 does not conform to the second predetermined status.

In the present exemplary embodiment, the second predetermined capacity can be 0. For instance, in the exemplary embodiments of FIG. 9A and FIG. 9B, valid data is not stored in any one of the physical units 800(0) to 800(F), indicating that the storage area 804 still has a lot of remaining space for data storage. Therefore, after the valid data stored in the physical unit 800(F+1) is deleted, the physical unit 800(F+1) can be changed to be associated to the temporary area 802 instead. Moreover, in another exemplary embodiment, the second predetermined capacity can also be one predetermined percentage (such as 1% to 10% or greater) of the total available capacity of the physical units 800(0) to 800(F) associated to the storage area 804.

It may be mentioned that, the mapping relationship and the association relationship shown in the exemplary embodiments of FIG. 8A to FIG. 9B are both only exemplary and are not intended to limit the disclosure. For instance, in another exemplary embodiment, as the total data size of valid data stored in the rewritable non-volatile memory module 106 is changed, more or less logical units are allocated to be mapped to more or less physical units. Alternatively, in another exemplary embodiment, as the total data size of valid data to be stored or deleted is changed, the number of predetermined physical units for which the association relationship is changed each time may also be different.

Figure 10:
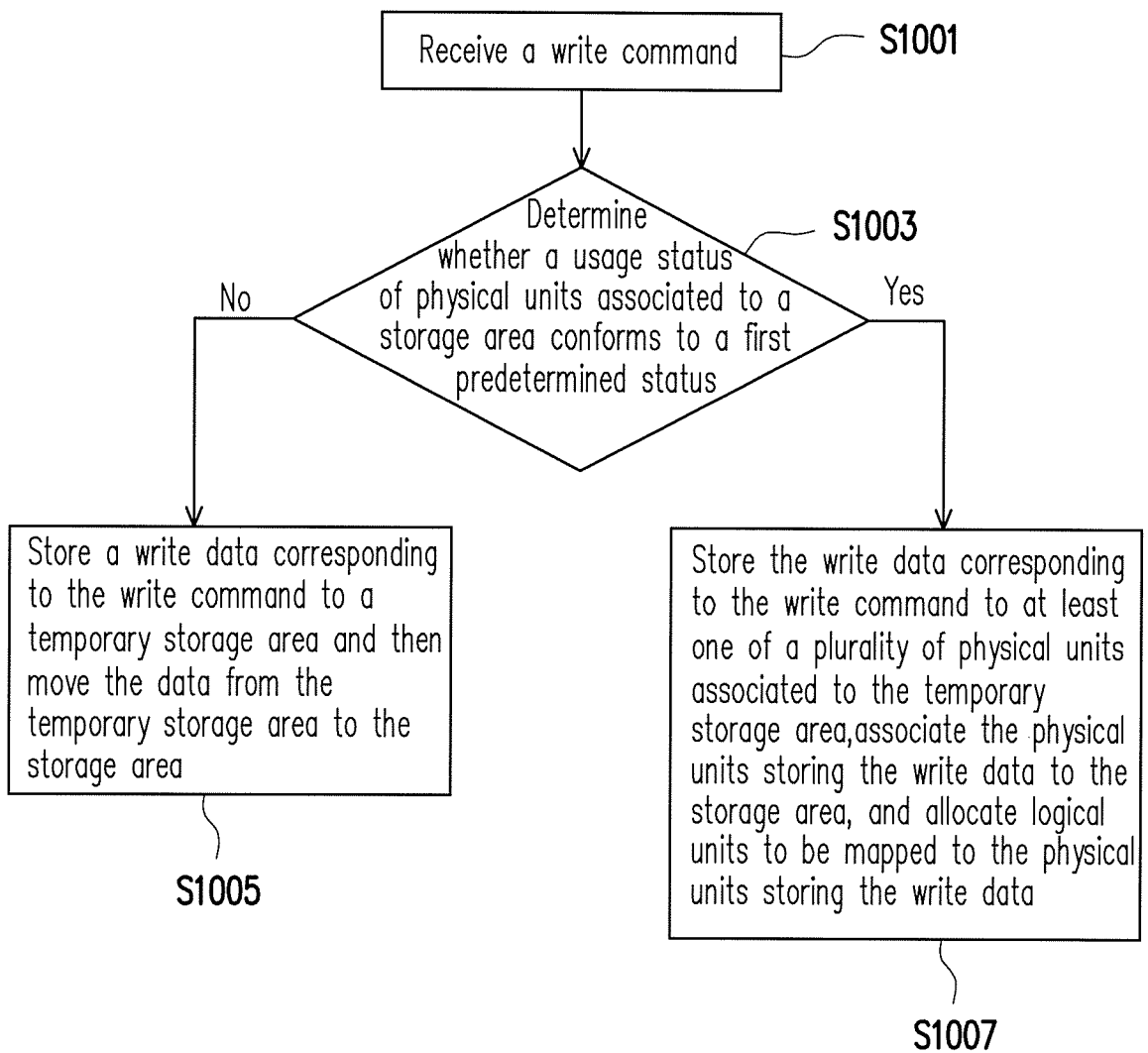
FIG. 10 is a flow chart of a memory management method illustrated according to an exemplary embodiment of the disclosure.

FIG. 10 is a flow chart of a memory management method illustrated according to an exemplary embodiment of the disclosure.

Referring to FIG. 10, in step S1001, a write command is received. In step S1003, whether the usage status of physical units associated to a storage area conforms to a first predetermined status is determined. For instance, whether the usage capacity of the physical units associated to the storage area conforms to a first predetermined capacity can be determined. If the usage status of the physical units associated to the storage area does not conform to the first predetermined status, then in step S1005, write data corresponding to the write command is stored in a temporary area, and then the data is moved from the temporary area to the storage area. If the usage status of the physical units associated to the storage area conforms to the first predetermined status, then in step S1007, the write data corresponding to the write command is stored in at least one of a plurality of physical units associated to the temporary area, the physical units storing the write data are associated to the storage area, and logical units are allocated to be mapped to the physical units storing the write data.

Figure 11:
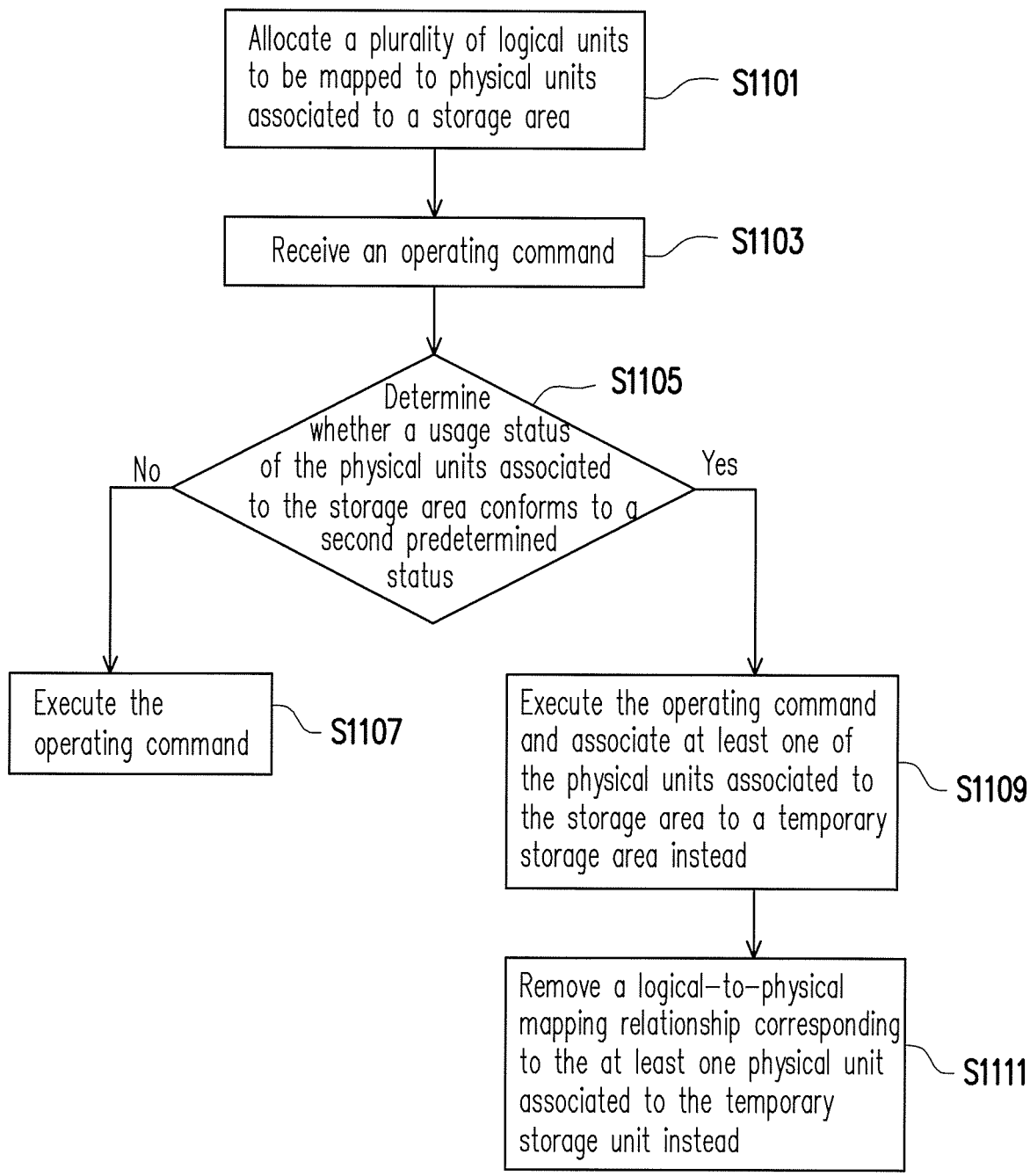
FIG. 11 is a flow chart of a memory management method illustrated according to another exemplary embodiment of the disclosure.

FIG. 11 is a flow chart of a memory management method illustrated according to another exemplary embodiment of the disclosure.

Referring to FIG. 11, in step S1101, a plurality of logical units is allocated to map physical units associated to a storage area. In step S1103, an operation command is received. For instance, the operation command instructs the deletion of a first data. In step S1105, whether the usage status of the physical units associated to the storage area conforms to a second predetermined status is determined. For instance, whether the first data instructed to be deleted is stored in one predetermined physical unit can be determined. If the usage status of the physical units associated to the storage area does not conform to the second predetermined status, then in step S1107, the operation command is executed. For instance, the first data is instructed to be deleted. If the usage status of the physical units associated to the storage area conforms to the second predetermined status, then in step S1109, the operation command is executed and at least one of the physical units associated to the storage area is changed to be associated to the temporary area instead. In step S1111, a logical-to-physical mapping relationship corresponding to the at least one physical unit changed to be associated to the storage area instead is removed.

Based on the above, in the disclosure, the respective capacities of the temporary area and the storage area in the rewritable non-volatile memory module can be dynamically changed, so as to improve the data access speed of the rewritable non-volatile memory module in the case of limited overall storage capacity of the rewritable non-volatile memory module.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method configured for a rewritable non-volatile memory module, wherein the rewritable non-volatile memory module comprises a plurality of physical units, and the memory management method comprises:
   receiving a write command and determining whether a usage status of a plurality of first physical units associated to a storage area among the plurality of physical units conforms to a first predetermined status;
   storing write data corresponding to the write command in at least one second physical unit currently associated to a temporary area among the plurality of physical units;
   associating the at least one second physical unit stored with the write data and currently associated to the temporary area to the storage area and allocating at least one logical unit to map the at least one second physical unit associated to the storage area to reduce a capacity of the temporary area in response to that the usage status of the first physical units associated to the storage area conforms to the first predetermined status; and
   moving the write data in the at least one second physical unit currently associated to the temporary area to a physical unit associated to the storage area without changing the capacity of the temporary area in response to that the usage status of the first physical units associated to the storage area does not conform to the first predetermined status,
   wherein one memory cell in the at least one second physical unit currently in the temporary area is configured to store only at least one first bit when first data is currently stored in the at least one second physical unit currently associated to the temporary area and a total number of the at least one first bit is a first number,
   wherein one memory cell in the first physical units currently in the storage area is configured to store a plurality of second bits when second data is currently stored in the first physical units currently associated to the storage area and a total number of the second bits is a second number,
   wherein the first number is less than the second number.

2. The memory management method of claim 1, wherein the step of determining whether the usage status of the first physical units associated to the storage area among the plurality of physical units conforms to the first predetermined status comprises:
   determining whether a usage capacity of the first physical units associated to the storage area conforms to a first predetermined capacity,
   wherein the usage capacity of the first physical units associated to the storage area corresponds to a total data size of valid data stored in the first physical units associated to the storage area.

3. The memory management method of claim 1, wherein a total available capacity of the first physical units associated to the storage area is less than a total logical capacity accessible to a host system.

4. The memory management method of claim 3, wherein the total logical capacity remains unchanged if the total available capacity is changed from a first capacity to a second capacity.

5. A memory control circuit unit configured to control a rewritable non-volatile memory module, wherein the rewritable non-volatile memory module comprises a plurality of physical units, and the memory control circuit unit comprises:

a host interface configured to be coupled to a host system;
a memory interface configured to be coupled to the rewritable non-volatile memory module; and
a memory management circuit coupled to the host interface and the memory interface,
wherein the memory management circuit is configured to receive a write command and determine whether a usage status of a plurality of first physical units associated to a storage area among the plurality of physical units conforms to a first predetermined status,
wherein the memory management circuit is further configured to send a write command sequence, wherein the write command sequence is configured to instruct storing write data corresponding to the write command in at least one second physical unit currently associated to a temporary area among the plurality of physical units,
wherein the memory management circuit is further configured to associate the at least one second physical unit stored with the write data and currently associated to the temporary area to the storage area and allocate at least one logical unit to map the at least one second physical unit associated to the storage area to reduce a capacity of the temporary area in response to that the usage status of the first physical units associated to the storage area conforms to the first predetermined status,
wherein the memory management circuit is further configured to move the write data in the at least one second physical unit currently associated to the temporary area to a physical unit associated to the storage area without changing the capacity of the temporary area in response to that the usage status of the first physical units associated to the storage area does not conform to the first predetermined status,
wherein one memory cell in the at least one second physical unit currently in the temporary area is configured to store only at least one first bit when first data is currently stored in the at least one second physical unit currently associated to the temporary area and a total number of the at least one first bit is a first number,
wherein one memory cell in the first physical units currently in the storage area is configured to store a plurality of second bits when second data is currently stored in the first physical units currently associated to the storage area and a total number of the second bits is a second number,
wherein the first number is less than the second number.

6. The memory control circuit unit of claim 5, wherein the operation of determining whether the usage status of the first physical units associated to the storage area among the plurality of physical units conforms to the first predetermined status by the memory management circuit comprises:
determining whether a usage capacity of the first physical units associated to the storage area conforms to a first predetermined capacity,
wherein the usage capacity of the first physical units associated to the storage area corresponds to a total data size of valid data stored in the first physical units associated to the storage area.

7. The memory control circuit unit of claim 5, wherein a total available capacity of the first physical units associated to the storage area is less than a total logical capacity accessible to the host system.

8. The memory control circuit unit of claim 7, wherein the total logical capacity remains unchanged if the total available capacity is changed from a first capacity to a second capacity.

9. A memory storage apparatus, comprising:
a connection interface unit configured to be coupled to a host system;
a rewritable non-volatile memory module comprising a plurality of physical units; and
a memory control circuit unit coupled to the connection interface unit and the rewritable non-volatile memory module,
wherein the memory control circuit unit is configured to receive a write command and determine whether a usage status of a plurality of first physical units associated to a storage area among the plurality of physical units conforms to a first predetermined status,
wherein the memory control circuit unit is further configured to send a write command sequence, wherein the write command sequence is configured to instruct storing write data corresponding to the write command in at least one second physical unit currently associated to a temporary area among the plurality of physical units,
wherein the memory control circuit unit is further configured to associate the at least one second physical unit stored with the write data and currently associated to the temporary area to the storage area and allocate at least one logical unit to map the at least one second physical unit associated to the storage area to reduce a capacity of the temporary area in response to that the usage status of the first physical units associated to the storage area conforms to the first predetermined status,
wherein the memory control circuit unit is further configured to move the write data in the at least one second physical unit currently associated to the temporary area to a physical unit associated to the storage area without changing the capacity of the temporary area in response to that the usage status of the first physical units associated to the storage area does not conform to the first predetermined status,
wherein one memory cell in the at least one second physical unit currently in the temporary area is configured to store only at least one first bit when first data is currently stored in the at least one second physical unit currently associated to the temporary area and a total number of the at least one first bit is a first number,
wherein one memory cell in the first physical units currently in the storage area is configured to store a plurality of second bits when second data is currently stored in the first physical units currently associated to the storage area and a total number of the second bits is a second number,
wherein the first number is less than the second number.

10. The memory storage apparatus of claim 9, wherein the operation of determining whether the usage status of the first physical units associated to the storage area conforms to the first predetermined status by the memory control circuit unit comprises:
determining whether a usage capacity of the first physical units associated to the storage area conforms to a first predetermined capacity,
wherein the usage capacity of the first physical units associated to the storage area corresponds to a total data size of valid data stored in the first physical units associated to the storage area.

11. The memory storage apparatus of claim 9, wherein a total available capacity of the first physical units associated to the storage area is less than a total logical capacity accessible to the host system.

12. The memory storage apparatus of claim 11, wherein the total logical capacity remains unchanged if the total available capacity is changed from a first capacity to a second capacity.

* * * * *